United States Patent
Eller et al.

(10) Patent No.: US 6,643,555 B1
(45) Date of Patent: Nov. 4, 2003

(54) METHOD AND APPARATUS FOR GENERATING AN APPLICATION FOR AN AUTOMATION CONTROL SYSTEM

(75) Inventors: Thomas Eller, Moerfelden (DE); M. Remi Peyrou, Frankfurt am Main (DE)

(73) Assignee: Schneider Automation Inc., North Andover, MA (US)

( * ) Notice: Subject to any disclaimer, the term of this patent is extended or adjusted under 35 U.S.C. 154(b) by 416 days.

(21) Appl. No.: 09/685,926

(22) Filed: Oct. 10, 2000

(51) Int. Cl.[7] ............................................... G05B 15/00
(52) U.S. Cl. ............................ 700/83; 700/17; 700/18; 700/19; 700/23; 700/86; 700/87; 709/106; 709/107; 709/220; 709/221; 709/223; 703/13; 703/14; 703/15; 706/5; 706/14; 706/21; 706/920
(58) Field of Search ............................... 700/17, 18, 19, 700/20, 23, 83, 86, 87, 88, 28, 29, 30, 31; 709/106, 107, 220, 221, 223, 224; 706/5, 14–15, 21–23, 420; 703/13, 14, 15

(56) References Cited

U.S. PATENT DOCUMENTS

| | | | | |
|---|---|---|---|---|
| 4,990,838 A | * | 2/1991 | Kawato et al. | 700/246 |
| 5,572,731 A | * | 11/1996 | Morel et al. | 717/104 |
| 5,611,059 A | * | 3/1997 | Benton et al. | 345/734 |
| 6,275,977 B1 | * | 8/2001 | Nagai et al. | 717/104 |
| 6,327,511 B1 | * | 12/2001 | Naismith et al. | 700/19 |
| 6,445,963 B1 | * | 9/2002 | Blevins et al. | 700/44 |
| 6,473,656 B1 | * | 10/2002 | Langels et al. | 700/17 |
| 6,484,061 B2 | * | 11/2002 | Papadopoulos et al. | 700/83 |
| 6,501,996 B1 | * | 12/2002 | Bieber | 700/19 |
| 6,510,352 B1 | * | 1/2003 | Badavas et al. | 700/19 |

OTHER PUBLICATIONS

WO 02/31607, filed Aug. 10, 2001, A Method and Apparatus for Generating an Application Program for an Automation Control, Eller et al.*

* cited by examiner

Primary Examiner—Ramesh Patel
(74) Attorney, Agent, or Firm—Michael J. Femal; Larry I. Golden

(57) ABSTRACT

An apparatus and method of generating an application for a control system. A control process is defined by a physical model and a topological model. An application generator utilizes the physical and topological models to generate an application for the control system.

25 Claims, 29 Drawing Sheets

METHOD AND APPARATUS FOR GENERATING AN APPLICATION FOR AN AUTOMATION CONTROL SYSTEM

RELATED REFERENCES

U.S. Pat. No. 5,611,059, "Prelinked Parameter Configuration, Automatic Graphical Linking, And Distributed Database Configuration For Devices Within An Automated Monitoring/Controlling System," issued Mar. 11, 1997, is incorporated herein.

TECHNICAL FIELD

The present invention relates generally to an industrial automation system including software that is used to collect data, to monitor devices within an industrial environment and to trend characteristics of devices within an industrial environment for monitoring and/or controlling the industrial environment or control structure. More specifically, the present invention relates to automatically generating an application of a defined process for a control system.

BACKGROUND OF INVENTION

Designing an automation control system requires input from several areas. At a minimum, the process engineer and control engineer must coordinate their efforts to obtain a workable control system. Most tools used to develop process control systems today are programming tools that are used by application software specialists. A problem associated with such an approach is that process engineers find it difficult to utilize the application software and to determine if it matches their needs. Also, the process engineers usually have to develop requirement specifications for the application software specialist because the application software specialist does not identify with a process requirement that defines Standard Operating Procedures (SOPs), nor is the software specialist familiar with Pipe work and Instrument Drawings (P&IDs).

Typically, the process engineer designs a process for the control system. The control engineer works from the process design to create an application for the control system. However, because the process and control engineer have a different perspective of the automation control system, the final output, i.e., application, of the control engineer does not necessarily correlate to the process initially designed by the process engineer. Augmenting this inherent problem is the implementation of two programming environments for control and human-machine interface. Thus, the programming tools used for each area may not include aspects of the other's area. Furthermore, design tools implemented by process and control engineers do not necessarily cooperate well with each other.

Inefficiency results because the respective data bases of the process and control domain areas are not integrated. Information is scattered in different files and tools. Data entry is often duplicated because of the non-integrated databases. A large amount of trouble shooting is further required by those individuals involved with creating the automated control system. Presently, there is not a tool capable of designing an automation control system that simultaneously incorporates the control and HMI aspects of a process control system.

The present invention is provided to solve these and other problems.

SUMMARY OF THE INVENTION

The present invention allows a user to save a great amount of time in creating a control/monitoring application. The invention simultaneously and automatically generates an application for a control system incorporating the various aspects of the control system, i.e., controllers, human-machine interfaces (HMI), diagnostics, and others; from a process design. A user inputs the process design and definitions into an application generator, e.g., one-step generator (OSG), and an application for the control system is generated from this input. U.S. Patent Application entitled, "Scanner for a Control System with Peer Determination," Serial No. 09/224,196, filed Dec. 30, 1998 (now U.S. Pat. No. 6,327,511), is an example of a control system capable of having its application program generated by the present invention.

One embodiment of the present invention is directed to a method of generating an application for a control system. The method comprises providing a single entity device representing at least one process object, the device comprises a supervisory aspect and a control aspect of the device. A physical model of the control process is defined. The physical model having a structure, the structure having a hierarchy of levels comprising at least one device. A topological model of the control process is also defined. The topological model having an architecture comprising a controller and a human-machine interface. The physical and topological models are analyzed. The physical and topological models are input into a generator and an application for the control system is generated. The generated application comprises a control aspect and a human-interface aspect.

Another embodiment of the present invention is directed to an apparatus for generating an application for a control system wherein a control process is defined as a physical model and a topological model. The apparatus comprises an analyzer for examining the physical model and the topological model to ensure operable cooperation between the physical and topological models; and, a generator for receiving the physical model and the topological model. The models are input into the generator wherein the application is to be generated and executed on the control system.

A further embodiment of the present invention is directed to an application constructed from a process object or smart control device (SCD) specification and maintenance database and an application generator. The SCD is a multi-facet object that can be controlled, operated, documented, monitored, viewed, diagnosed, etc. The SCD specification provides the definition and maintenance of control objects to be used in the automation system. The SCDs within the database are not limited to one particular manufacturer or type. The application generator builds the application from a user's process design utilizing the control objects. The user selects a type and quantity of device from an SCD library that will be integrated within the control system. After the SCDs have been defined in the application generator, an application is generated for the control system, i.e., controller logic, HMI, communication throughout the system.

Yet a further embodiment of the present invention is directed to a functional tool that can be used by the process engineer, or by an engineer familiar with process standards. Consequently the standards which will be used will comply with:

§88.01 standard for Batch Control, to the terminology relevant to continuous process control either standard and/or user defined process devices as specified in this document either standard and/or user defined naming and tagging convention as specified in this document good automation manufacturing practices (GAMP) standard for application engineering either standard and/or user defined graphic and color convention as defined in this document.

A further embodiment of the present invention is directed to a methodology for the design of process objects to be applied to automation tasks involving numerous networked PLCs and Supervisory HMI workstations. From the process design, a generator will generate the code for the PLC logic, i.e., Concept projects, and the supervisory system, i.e., HMI applications. The present invention can be implemented as a single, integrated tool, which will allow the user to better analyze and understand his process needs and to develop process objects specific to these needs. The process objects encapsulate the principle parts of an automated machine in objects. The encapsulated devices are all objects. Once created, these objects can be reused as modular building blocks. The process objects will generally reside in the PLC and will include all attributes and variables associated with each object, including those currently used by the HMI e.g. graphic representation. Using predefined libraries of standard process objects, significant programming productivity and code standardization benefits can be realized. The present invention is designed to save time during the development of the application software because the application software will already have been defined, tested and proven process objects.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION OF PREFERRED EMBODIMENT

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

An application generator 20 (OSG) is a process design tool for process automation. The application generator 20 closes the gap that exists between the process engineer and the control engineer. In the past, both parties have worked with specialized tools that were incompatible. Changes to the process design defined by the process engineer had to be repeated by the control engineer.

The application generator 20 utilizes another process control design tool called a Smart Control Device 22 (SCD). The tools cooperate to reduce control design problems related to integrating process control design tools (e.g., ISA §88 compliant tools), control design tools (i.e., PLC programming tools), HMI design tools (i.e., SCADA configurators), CAD design tools (i.e., electrical drawings) and diagnostic tools. Incongruities exist between the automation system models, e.g., process, control, HMI, CAD, diagnostic, etc., that require frequent and duplicate data entries in the system. Due to the discrepancies between "incompatible" databases, it was preferable to use automation tools that were developed by a single supplier.

Figure 1:
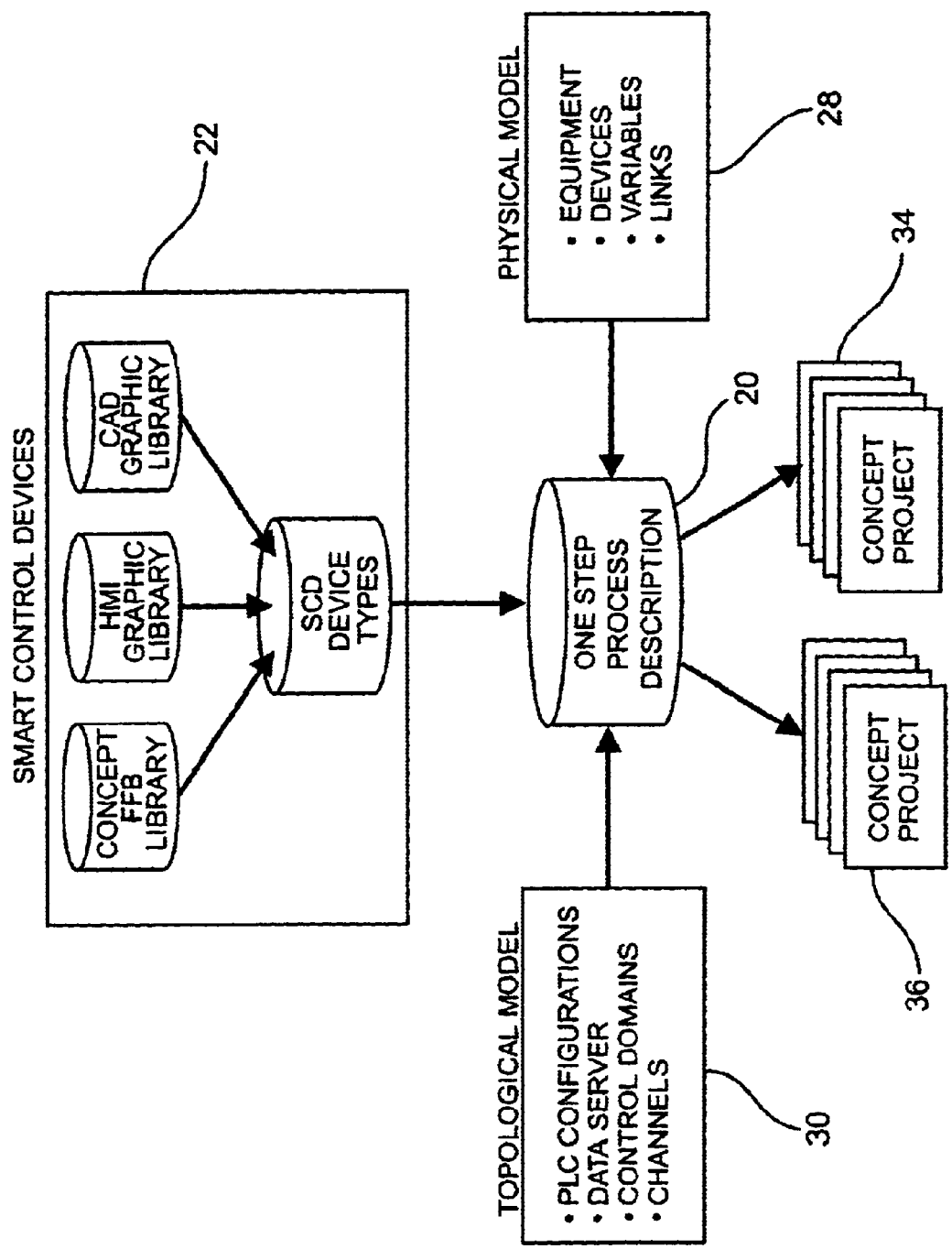
FIG. 1 is a graphical overview of the system architecture of the present invention.
Figure 2:
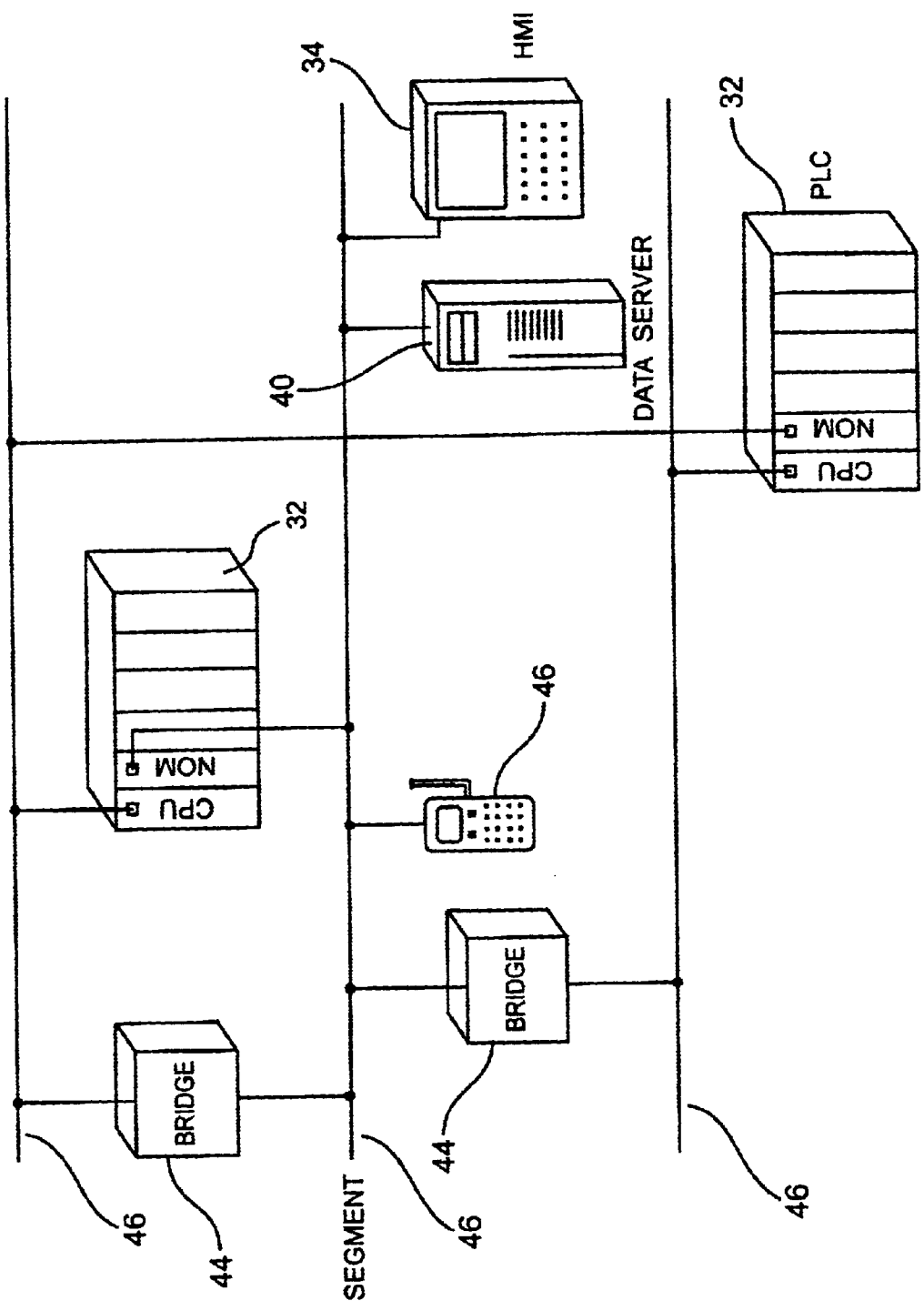
FIG. 2 is a diagram showing a general model of a control network.
Figure 3:
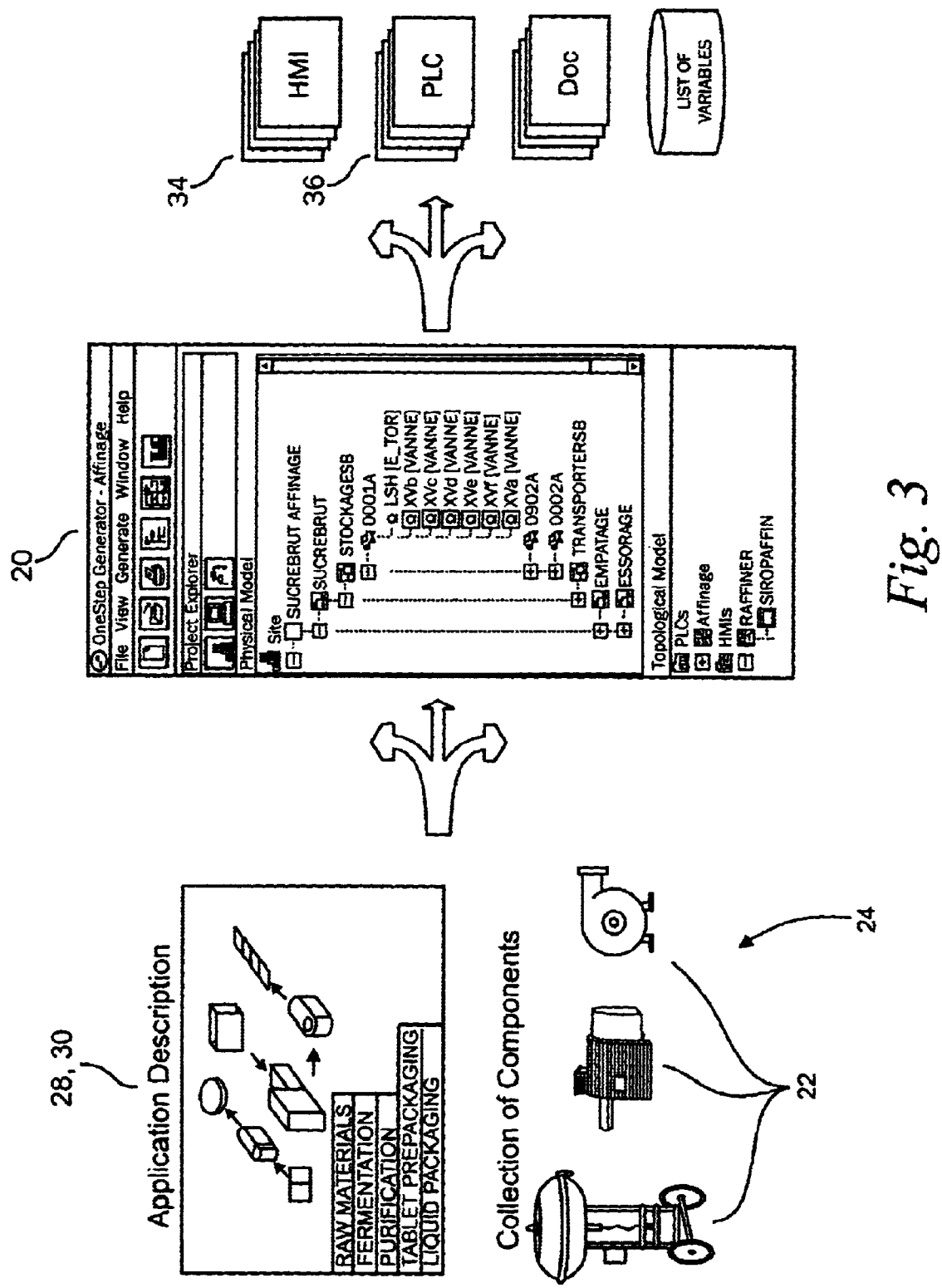
FIG. 3 is a graphical flow diagram of the present invention.

The present invention provides a user with the ability to generate an application by inputting process definitions into a generator 20. Briefly, and referring to FIGS. 1–3, the apparatus is comprised of a process object 22 (smart control device, SCD) specification and maintenance, a model of the process and the application generator 20. The SCD 22 specification and maintenance provides a tool for definition and maintenance of control objects. The generator 20 builds one or more applications from a user's defined process for utilizing the process objects required for a project. The user generates an application by selecting from a SCD library 26, the quantity and type of device that will exist within the control system 24. The defined process is input into the application generator 20 and an application is automatically generated. The generated application comprises control and HMI attributes as well as diagnostic, documentation, schematic, etc. Preferably, the application generator 20 generates controller logic for Concept, a control programming software of Schneider Automation; and an HMI logic related to the objects created with an application generator 20 for different HMI products similar to other supervisory control and data acquisition (SCADA) software products, such as: Intellution's iFIX and Arc Informatique's PCVUE.

Such an approach significantly reduces the possibility of error between the two system levels during the transfer of the process objects from the generator 20 to the HMI 34 and PLC 32 respectively. This also simplifies the testing and validation required to ensure that the two levels are correctly synchronized during the factory and site acceptance tests of the completed application software.

The present invention can be considered a methodology and tool that assists a user in automating a control process. The user must develop a process perspective, examine the process in its entirety and understand the equipment involved. The process should be viewed as a system and the role of every major processing unit must be understood. E.g. a weighing system may be a shared resource in the process used by several pieces of equipment (e.g. mixers).

In order to fully understand the process, a top down analysis of the process should be carried out. The top down analysis should consider the following issues: the major process steps involved and the role of the equipment in the control process.

Once the major process steps are identified, the steps should be analyzed and successively decomposed into more detailed process steps and their components. These actions should be focused on the tasks to be carried out, and not on the detail of how to solve these tasks. Once the user has fully understood the make up of the process to be automated, the present invention provides various tools to assist the user with a bottom up implementation.

The generator 20 is a configuration tool intended to develop application software automatically for a range of process automation projects. It will allow the user to define and apply integrated process objects 22 for supervisory and process control. The generator 20 is intended for use by process engineers or engineers familiar with the process. It is not required that the engineers be familiar with software and programming tools or their application.

A complete description of the plant automation comprises the different aspects of the PLC equipment, the supervisory (HMI) stations and the electrical and mechanical layouts. In the generator 20, the process is described functionally in a 'language' that all personnel involved in the different phases can understand: the process engineer, the automation engineer, the electrician, the operator and the maintenance people. Thus, present invention provides:

a method to improve the quality of the solution, and to assist in the process of validation,
  a 'language' describing the process for the system design phase,
  a specification for the implementation and the commissioning phases,
  documentation for the operation, maintenance and detection of defects, and,
  a procedure which warns the user when changes have been made to the control system.

Figure 4:
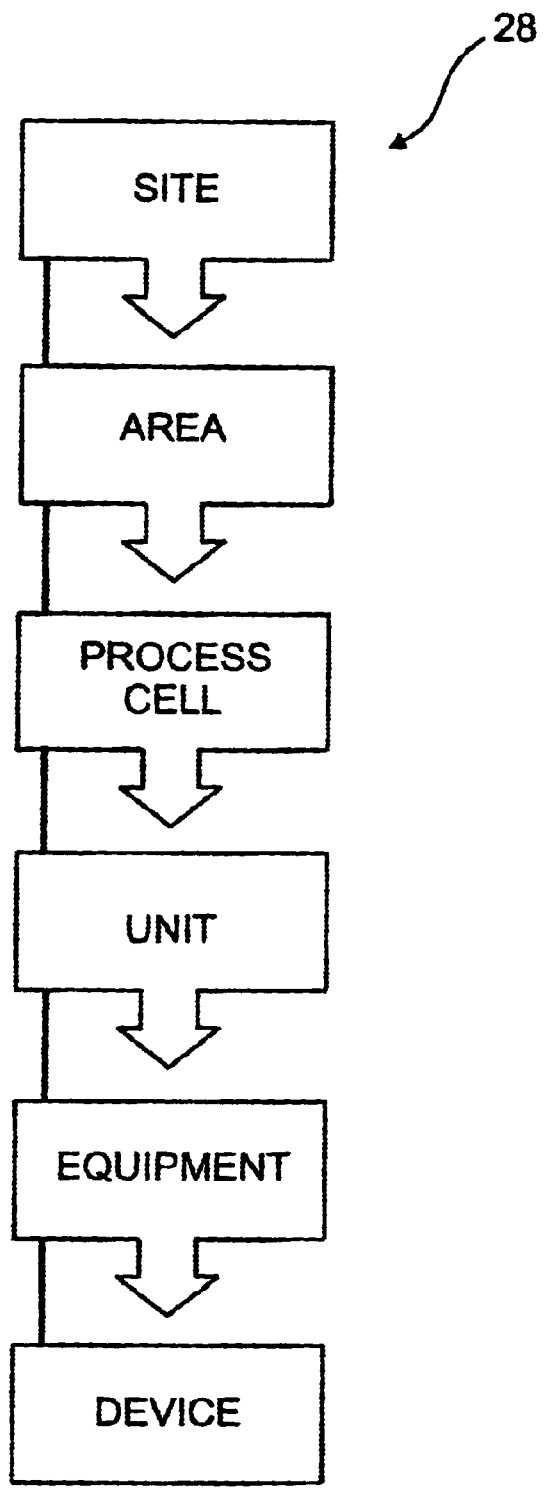
FIG. 4 is a graphical diagram of a physical model of a control system.

For the process engineer, the application generator 20 allows for the defining of a general layout of the process based on objects defined within a physical model 28 of the ISA §88.01 standard-like area, i.e., site, process cell, unit, equipment 38 and device 36; and, to link from the application generator 20, objects to basic tools such as E-plan, Autocad, P&ID drawings, etc. FIG. 4.

The §88 standard describes a hierarchy to structure the complete automation facilities in a physical model 28. FIG. 4 shows the complete hierarchy the designer can define to describe the automation process. The lines symbolize a one-to-many relation, e.g., a unit consists of one or multiple equipments. The areas, process cells and units are used to structure the automation plant into sections that perform different tasks. Note: There are some differences in the naming conventions used in ISA §88 and the application generator 20. As mentioned in the ISA standard, the structure is determined by physical, geographical, or logical reasons. The boundaries of the elements are usually based on organizational or business criteria as opposed to technical criteria. There are many factors other than process control that affect these boundaries.

Figure 5:
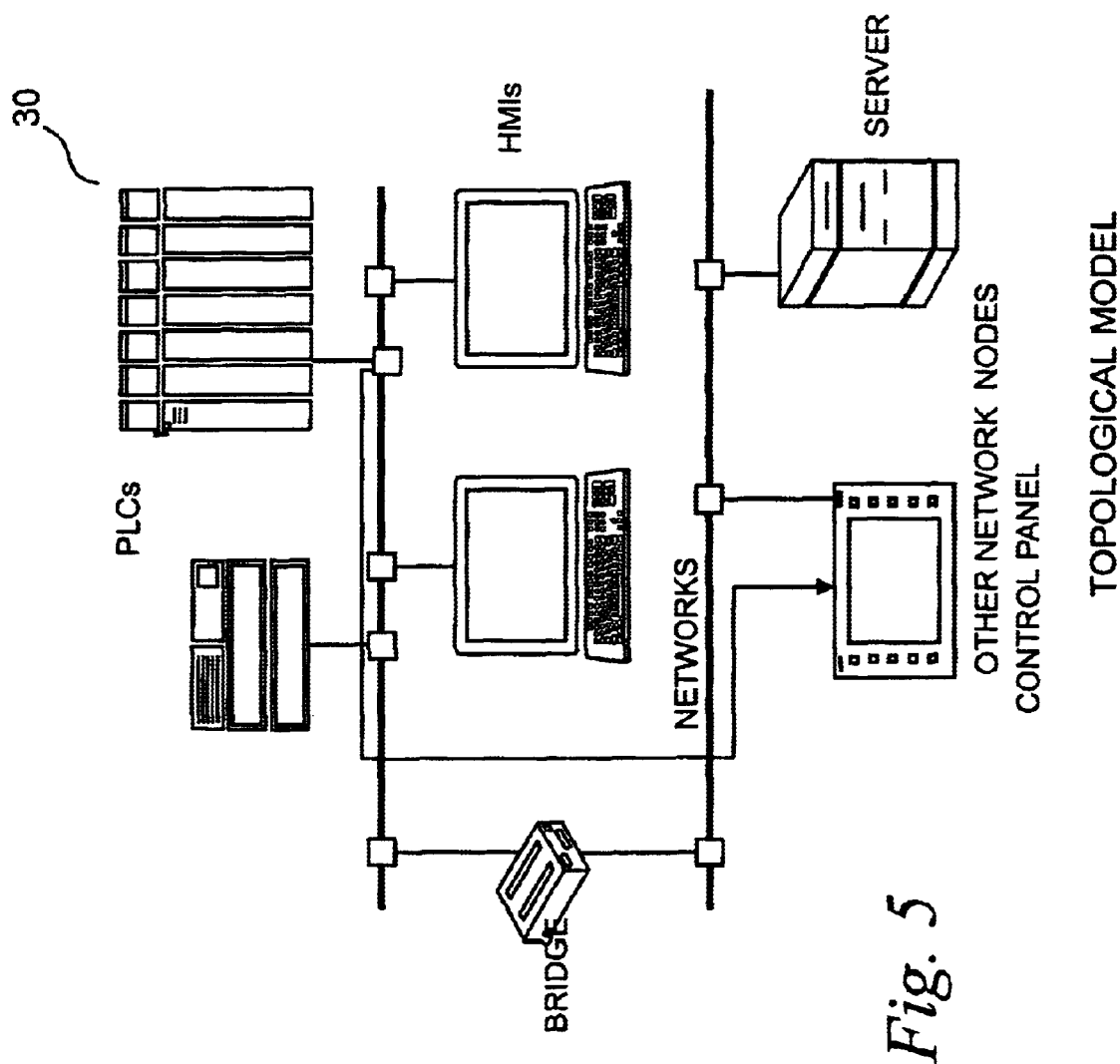
FIG. 5 is a graphical diagram of a topological model of a control system.

For the control engineer, the application generator 20 allows for the building of the control architecture with PLCs 32, HMIs 34 and networks as a topological model 30; and to assign the control logic to the objects the process engineer has defined. FIG. 5. Approximately 30–50% of the application control logic for the PLC 32 and the HMI 34 are generated from the process design input. The application generator 20 facilitates the design of a control system 24 with multiple PLCs 32 and HMIs 34.

The first stage in developing a process control system is to define the functional process requirements themselves. In order to work with the generator 20, a process description is required which will comply with a standard application methodology such as GAMP (Good Automation Manufacturing Practice). The minimum requirement is: Standard Operating Procedure (SOP), Pipe work & Instrumentation Drawings (P&ID) and a Process Layout Conventional programming tools required further specifications to be developed, such as User Requirements Specifications (URS) and Functional Design Specifications (FDS). These additional tools were required largely to interpret the process needs to other personnel who will work on the process. Unlike these conventional tools, the present invention works at the functional level, and largely eliminates the need to prepare URS and FDS. Equally as significant, the generator 20 eliminates the interpretation problems between the various engineering and software disciplines working on the project.

The second stage of defining the functional process requirements is to define a quality plan and a test plan. The quality and test requirements are defined during the specification phase and are known prior to detailed application engineering start up. To describe the complete automation of the plant, a methodology for partitioning the manufacturing equipment into an §88 type hierarchy is to be used.

Aspects of the Plant That Require Analysis Include:

Physical Model:
  The description of the physical equipment used for the automation.

Topological Model:
  PLCs: the configuration of all PLCs, the I/O and the communication between PLCs and other devices.

Supervisory System: the description of the operator stations and the topology how the different parts of the site are controlled.

Figure 6:
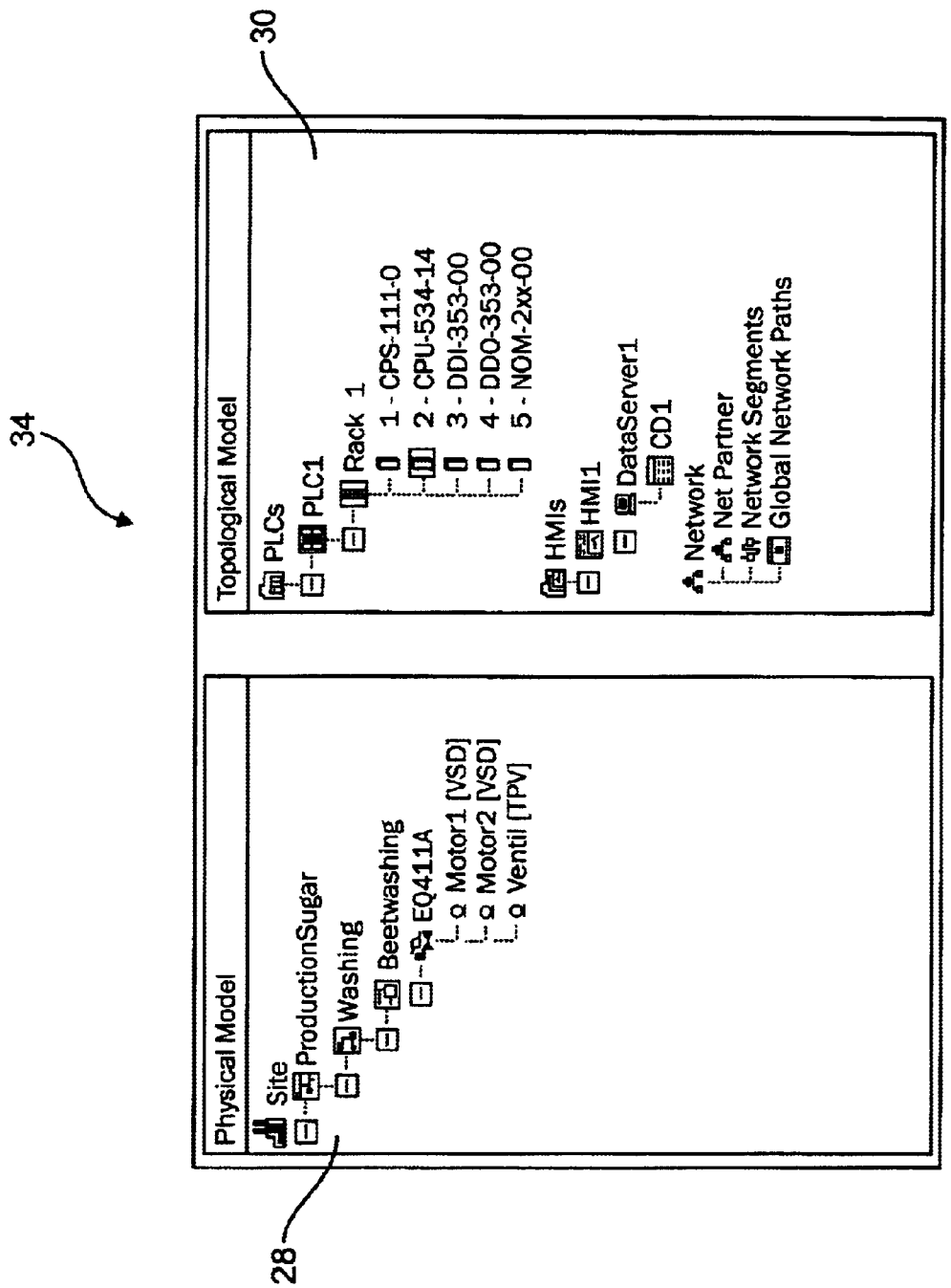
FIG. 6 is a diagram of a screen display of physical and topological model.

A display window of the application generator 20 displays the process design's physical model 28 and topological model 30 as an object tree. FIG. 6. The physical model 28 is usually designed by the process engineer and the topological model 30 is typically designed by the control engineer. The elements of the physical model 28 are mapped to the resources in the topological model 30.

Figure 11:
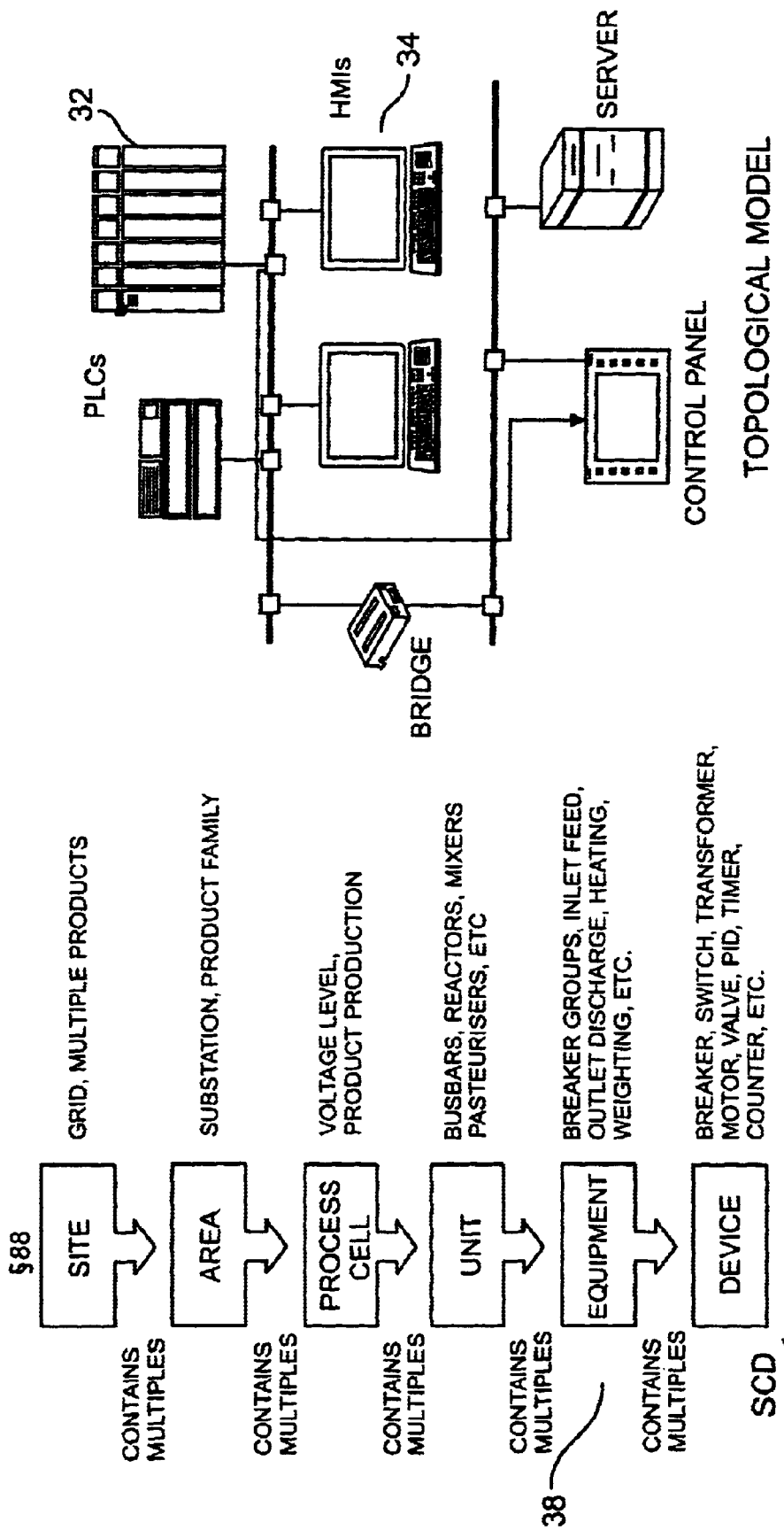
FIG. 11 is a graphical diagram depicting the §88 methodology for partitioning manufacturing equipment and the associated control system implementation.

FIG. 11 shows the architecture for the preferred embodiment of the present invention. The §88 methodology for partitioning manufacturing equipment and the associated control system implementation as shown side by side.

The present invention reduces the time required for the development of the application software because the application software will be pre-defined, tested and proven process objects. When new process objects are required, the generator 20 will provide a tool to define the new objects quickly and accurately for subsequent re-use. The user will be able to construct the process control objects for use in both the supervisory and control applications. Because the process objects used in the application are already tested, there is no reason to test them during subsequent project factory and/or site acceptance tests (FAT & SAT) of the completed application. The user can focus on the testing of the safety, sequence, and regulatory control, etc., of the application software.

In short, the generator 20 will have an impact on every part of a process control project. It will allow the user of the tool to significantly reduce the life cycle costs of automation projects by carrying out the engineering tasks more productively. The present invention is intended to be a functional tool that can be used by the process engineer, or by an engineer familiar with process standards.

The process database is used by the run-time control system to allow the operator to control the process. While much of the process data will reside in the PLC 32, and hence in the controller database, other aspects of the process database will reside in the human-machine interface 34 (HMI). The process database should not be confused with the controller database where the process engineers work with libraries of process objects in order to develop the run-time system for the operator.

The difficulty with using HMIs and PLCs together as a process control system is that there is no single process database in such a system, and the split database between the two levels, 1 and 2, is not synchronized. Previously it has been impossible to develop such a process control solution with one database. Level 2 systems run on standard PCs with Microsoft software that is not robust enough to use for operating the process directly. PLCs have not had enough memory and were poor at handling large data files.

Figure 12:
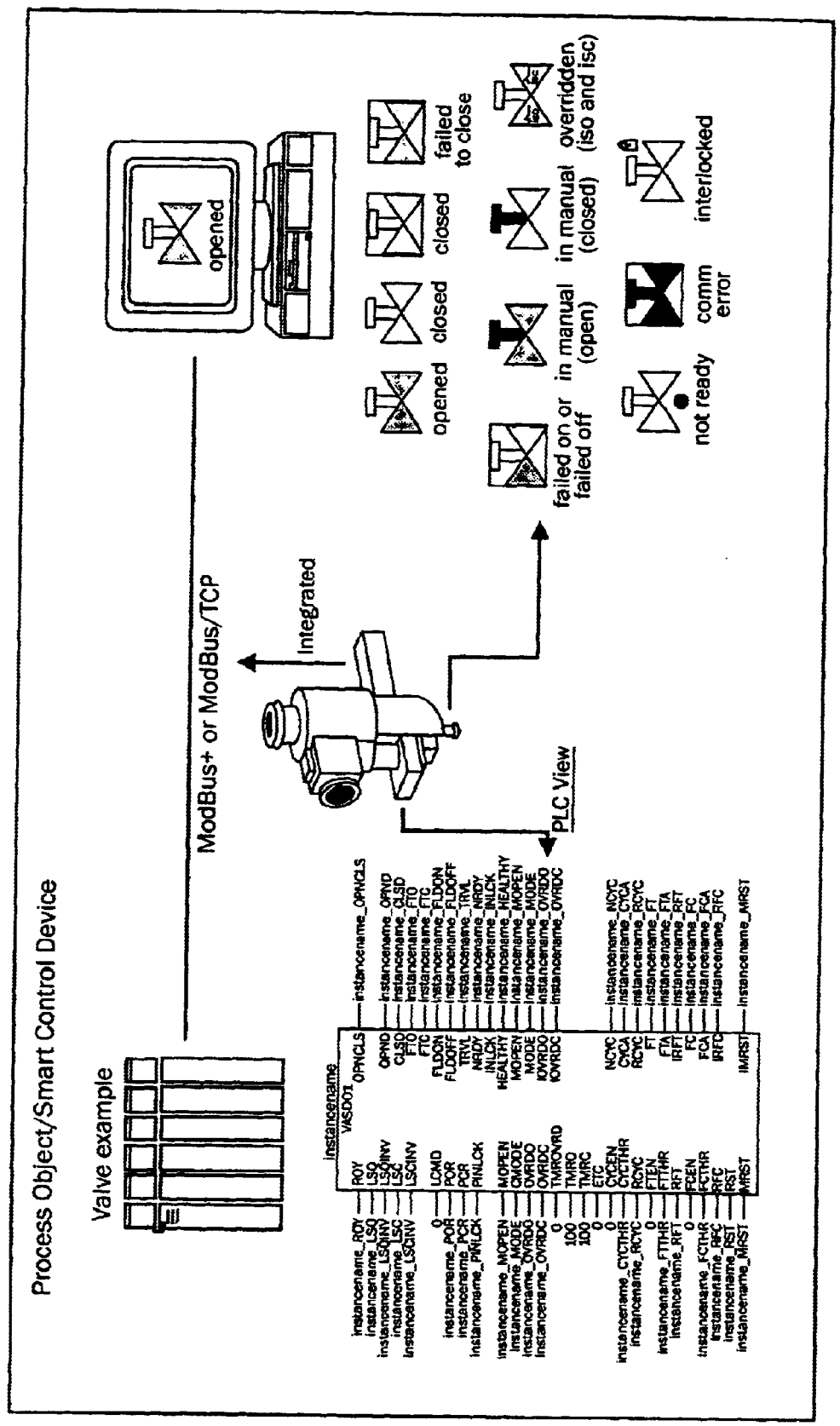
FIG. 12 is a graphical diagram of the details of the process object (SCD) database for a process valve device.

The generator 20 will ensure consistent use of the process objects 22 located in the PLC and HMI. The process designer will work with the process objects—SCDs and will not differentiate whether the source code being generated will eventually run at level 1 or level 2 (PLC or HMI). Logic concerned with the automation of the process will be run in the PLC 32. The HMI 34 will work largely as a window into the process and will provide the operator with the various functions required in order to manage the process. Details of the process object (SCD) database for a process valve device is shown in FIG. 12.

Figure 7:
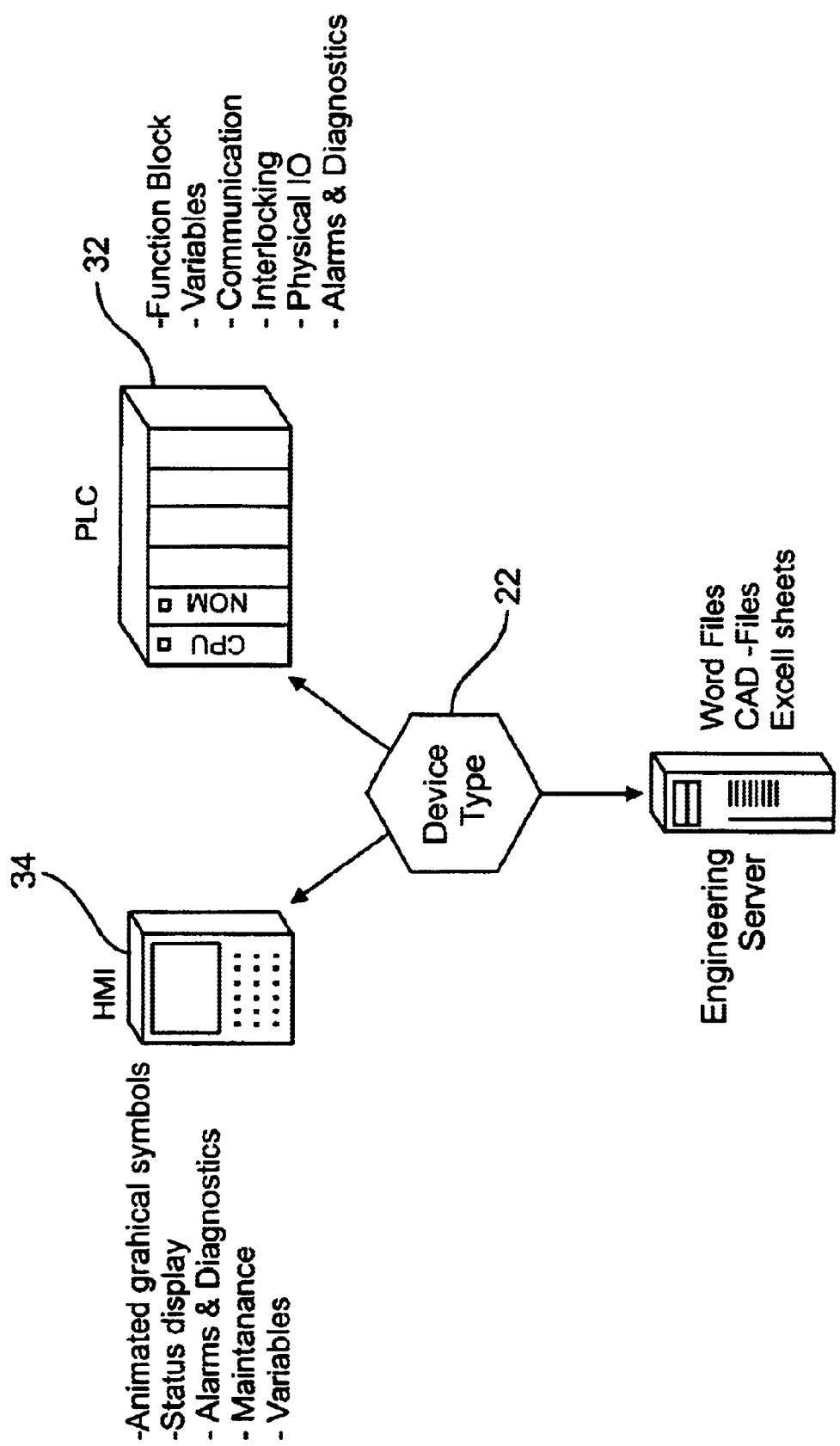
FIG. 7 is a graphical display of a device type.
Figure 8:
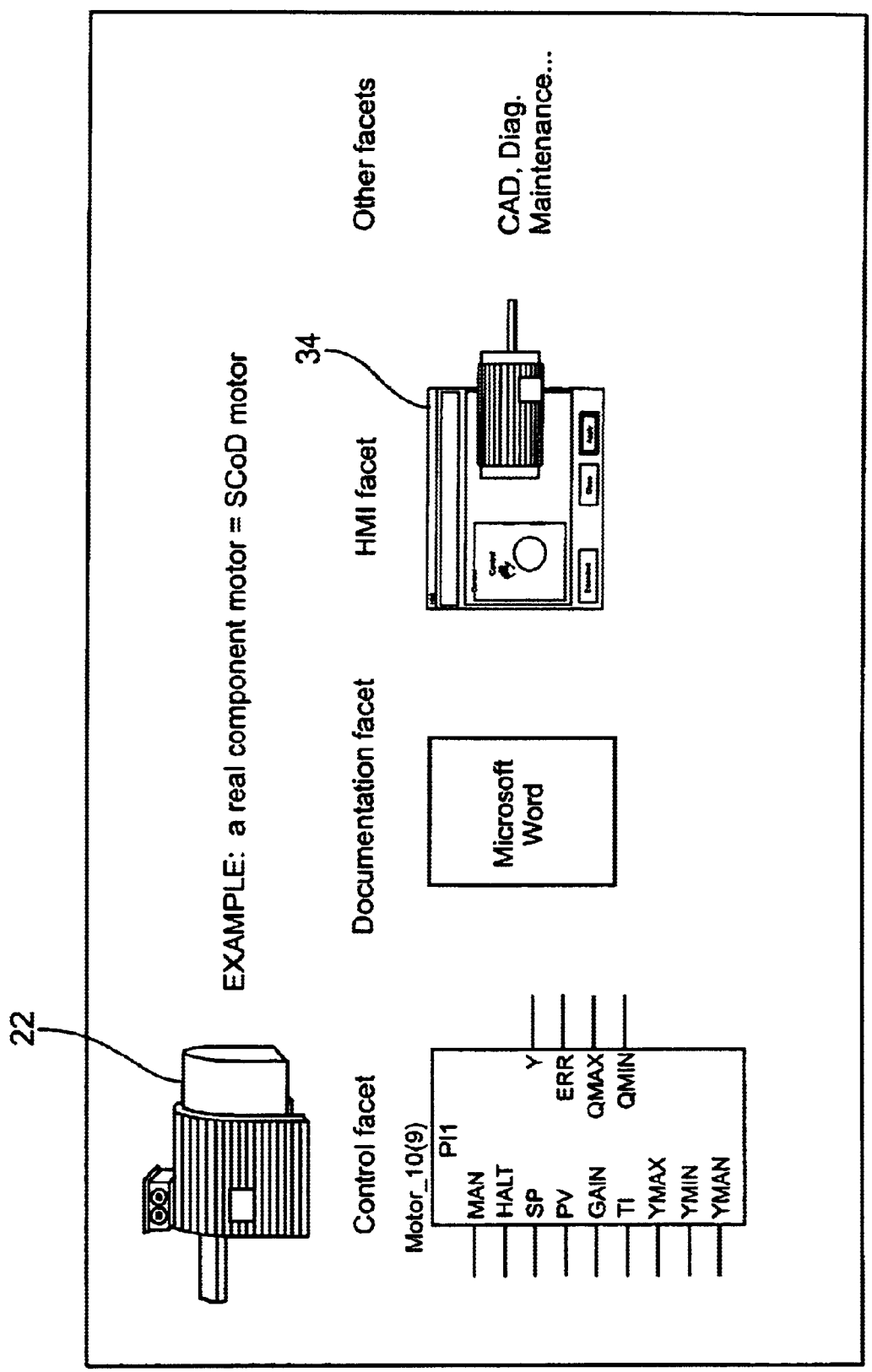
FIG. 8 is a graphical display of a smart control device.
Figure 9:
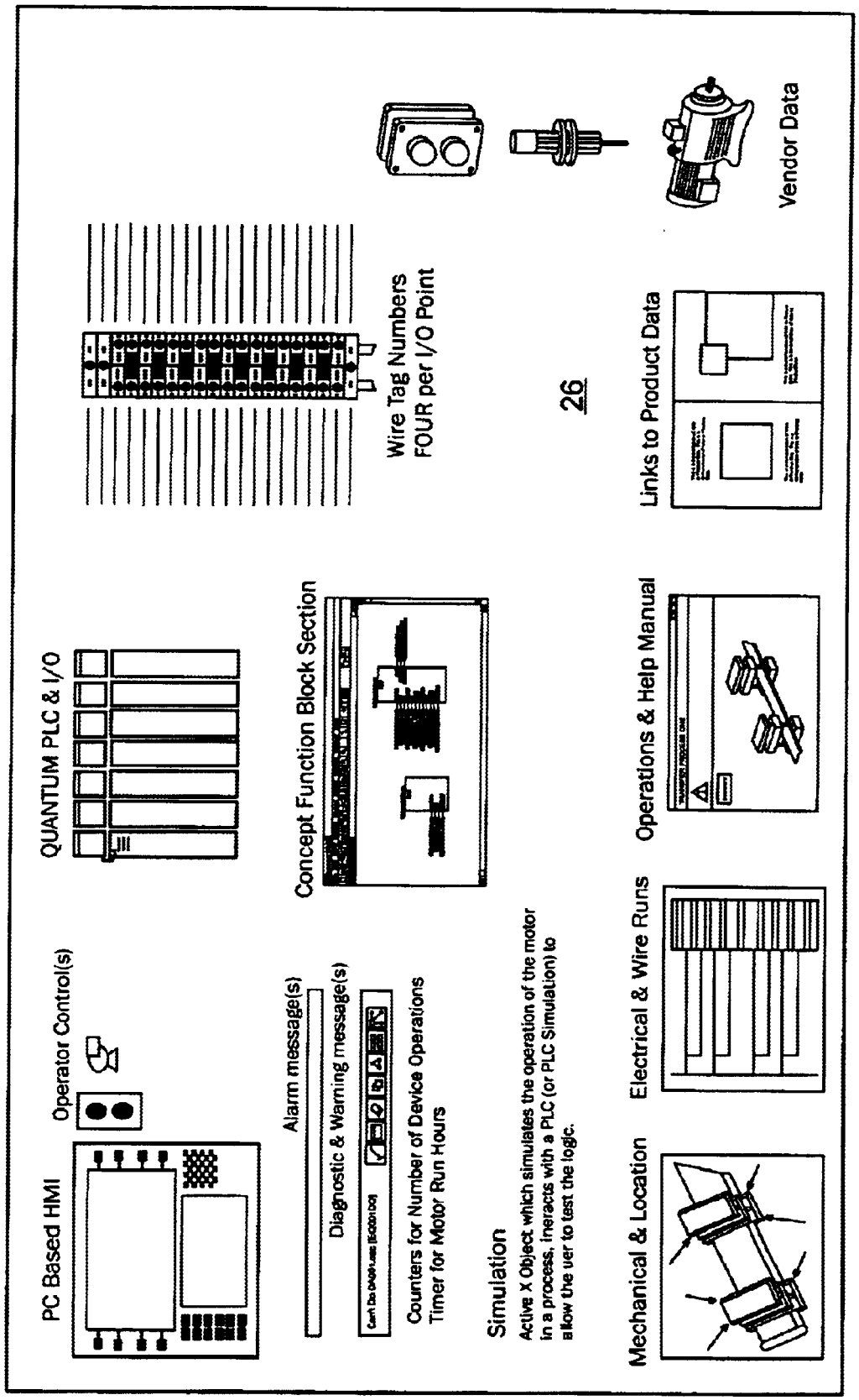
FIG. 9 is a graphical diagram showing the contents of a smart control device database.
Figure 10:
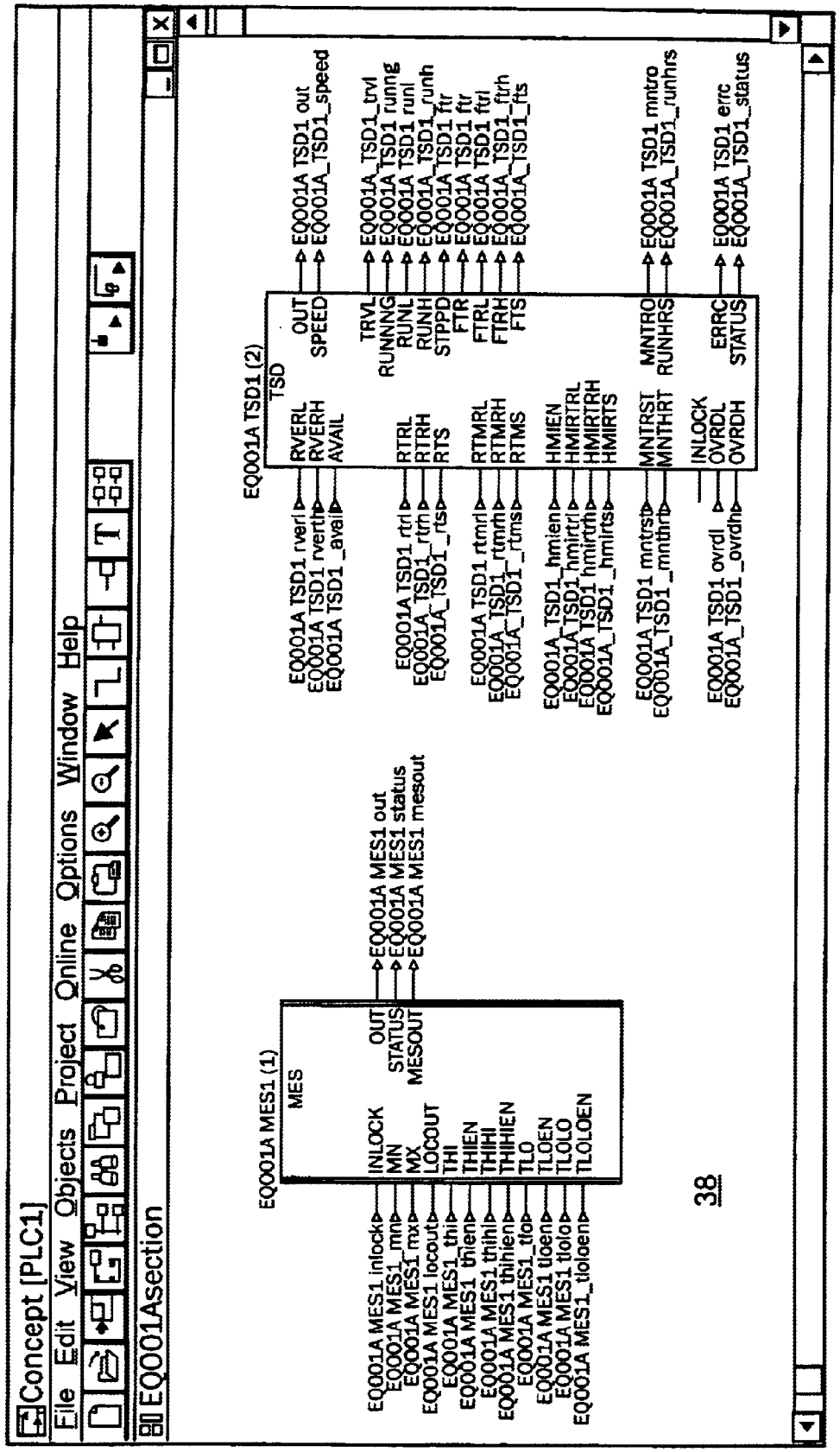
FIG. 10 is a graphical diagram of an equipment.

A process object or SCD 22 is a generic term used to define a multi-facet object that represents several aspects of a real control system 24. The process object 22 defines sensors, actuators and regulatory control equipment, that from a control viewpoint, is operated as a single entity. FIG. 7. A SCD may define an object in the real world, e.g., motor, valve, temperature transmitter, etc., and it can also define a software object which is used for regulation control or other control functions, e.g. PID loop, timer, counter. All higher level objects are composed of at least one SCD to form the more complex control process objects, i.e., devices 36 and equipment 38. The SCD 22 is a standard piece of an automation application that includes at least a control part and a HMI part. FIG. 8. An SCD library 26 contains the SCDs 22 and provides all documents required for the management of the devices, i.e., CAD, user's manuals, maintenance logs, etc. FIG. 9. SCDs 22 are used by the application generator 20 to design and automatically generate an application for a control system 24, human-machine interface, diagnostic system, etc.

SCDs are created as instances of reusable objects, called SCD Types. A SCD Type describes a unit of the process and comprises all aspects of the automation task; including the PLC logic, the representation for the operator in the supervisory system, the electrical and mechanical properties of the unit, and the maintenance and troubleshooting. The SCD will inherit all of the attributes of its type. In addition, it is possible to adjust the SCD to the specific task it performs by setting instance parameters and attributes. The generator 20 provides a flexible way to define which parts of the SCD type are fixed and which may be adjusted. The variable part of the SCD type definition is based on default values. This flexibility of the system results in ease-of-use. SCD types are defined and deployed in type libraries and the generator 20 has access to a standard library of process object types. The user will also have the ability to create his own library.

Device types are organized in libraries provided by the application generator 20. Additionally, specific device types can be implemented for a specific use. Device types can be reused and the specific behavior for the device 36 can be parameterized, e.g., a valve can be defined if it is working in the energize-to-open or energize-to-close mode. The features of a device 36 include:

representing a process object, i.e., an actuator or sensor, or a function of the process which manipulates data;

belonging to one equipment, devices cannot be shared between equipment;

being either a specific device type (SCD 22), or a free device;

the ability to communicate with devices of other equipment;

providing the (primary) entry point for the HMI 34 for visualization and interaction with the process; and, the ability to communicate directly with the PLC 32 and the HMI 34.

Each device 36 is represented by a function block within the section generated for the equipment 38. A device 36 is automatically assigned to the HMI 34 defined in the equipment properties. Each device 36 is represented by a graphic of its related physical object in the screen generated for the equipment. FIG. 8.

The SCD 22 can be viewed as an object oriented process design tool box. The tool box uses process terminology familiar to process engineers. PLC and HMI logic is automatically generated directly from the process design, P&IDs, SOPs, Process Layouts, etc. Using pre-tested process objects substantially reduces the time required for engineering the application. A consistent approach of using pre-tested process objects significantly improves quality and has a direct impact on test and validation results. By utilizing the OSG 20 and SCD 22, design costs can be significantly reduced.

Generation of the application by the application generator 20 involves the control system 24, i.e., process design, PLC, HMI, diagnostics, CAD drawings, etc. Formerly, automation tools only involved controller characteristics and did not include the process description or HMI. For example, the application generator 20 provides the user the capability to design a naming convention for all the variables of PLC and HMI applications. The naming convention is derived from the process design model and applied to the PLC 32 and HMI 34 models.

The application generator 20 automatically generates multiple parts of the application according to the process design, i.e., the control of a device 36 along with its HMI 34, its diagnostics and communications according to CAD drawings, etc. After the generation of the PLC logic and the HMI 34 design with the application generator 20, it may be necessary to add logic to the application program and to complete the HMI 34 design. All variables used in the PLC 32 and the HMI 34 must be defined within the application generator 20. These variables should be assigned to the objects of their respective physical models. For this reason, the designer can assign additional variables, free variables, to the device.

Every SCD 22 and physical equipment 38 has associated variables which are used for the PLC logic, the connection to the I/O points, the communication with the supervisory system or to other nodes on the network. There are two types of variables:

| Device Type | Variables: |
|---|---|
| variable of devices, which are inherited from the type of the device. | |
| Free | Variables: |
| variables, which are added to equipment, devices for additional PLC logic and HMI mimics. | |

There will be several users who will work with the generator 20 in different ways. The user will have certain access rights to the generator 20 depending on his skills and the tasks he is required to carry out. There is no requirement that each user utilizes the generator 20 in the same way, i.e., the access rights to certain features can be limited or even eliminated. At the simplest level, there will be three levels of usage. First, a level for administrators who will set up the system for the user or site. Secondly, for designers who will use the generator 20 to develop the process control system. Thirdly, for operators who will use the result of generator 20 to run the process.

The first task to be performed by a user is to configure the generator 20 to suit the standards for the project should the user decide not to utilize the standard, predetermined, device library and tagging convention of the generator 20. Most likely, this is a specialist task, which requires knowledge of Concept and the HMI programming tool. This task will be carried out by a system administrator or administrators. After the generator 20 is set up to meet the user's individual requirements, it will be changed infrequently to add, edit or delete device types.

Another user of the system can be the plant administrator. The plant administrator has access rights to the system in order to review all of the processes installed or available in the factory. This level of user will not modify the device library or libraries, but will be able to review and merge existing projects and planned developments that are coordinated by the project administrator(s). The plant administrator is usually a manufacturing specialist.

The project administrator will typically be a process specialist, who will have the access rights to review a development, and work with the generator's database. The project administrator can decide when to freeze a version of the project.

The major user of the generator 20 is the designer(s). The designer will be a process engineer or equivalent who need not have any special knowledge of a programming language such as Concept or iFix in order to use generator 20. The designer will not have the access rights to modify SCD types or the tagging convention. The designer will use the generator 20 to select and apply the process objects 22 required to automate the processes. The designer will populate the iFix database and will generate the equipments 38 and process objects 22 for Concept and iFix.

The generator 20 assists the designer with a bottom up implementation by allowing the designer to select SCDs 22, and generates the user's instrument list based on the actual devices the designer selects. This instrument list will also provide the unique names allocated to each equipment 38 and device 36 in accordance with the generator's tagging convention. The tagging convention will either be the supplied default convention or the user's own convention as defined by the system administrator. Because the instrument list is generated directly from the P&IDs, the generator 20 eliminates the need to prepare the I/O list manually.

The designer will be responsible to allocate on which PLC 32 and on which HMI 34 the individual equipment modules generated will be run. Each individual equipment 38 will be assigned to a single PLC 32 for execution. In exceptional cases, it is possible to split an equipment to run partly on one PLC 32 and partly on another. Equipments 38 will be assigned to one HMI 34 on the system. The generator 20 is responsible for synchronizing the PLC databases with the HMI database(s). The generator 20 will allow the designer to copy equipment and to re-use any number of copies in order to define the control process.

Once the automation system is integrated with the process in the factory, an operator runs the process. The operator has access to the functions made available in the PLC 32 and HMI 34 by the designer in order to run the process. The operator cannot change the logic of the automation system, but can make the changes necessary to run the process. While the operator is the final recipient of the automation system developed using the generator 20, the operator does not use the generator itself. Should any changes need to be made to the generator 20, the designer will carry out the necessary modifications on behalf of the operator.

In addition to the PLC and HMI automation, the operator does have access to the Help Windows created either by the system administrator or designer. The Help screens are intended for use by the operator and should help in resolving any problems encountered while operating the process. The operator need not have any special knowledge of iFix programming, Concept or the generator 20. Indeed, the operator he will not have access rights needed to make use of these tools.

Figure 13:
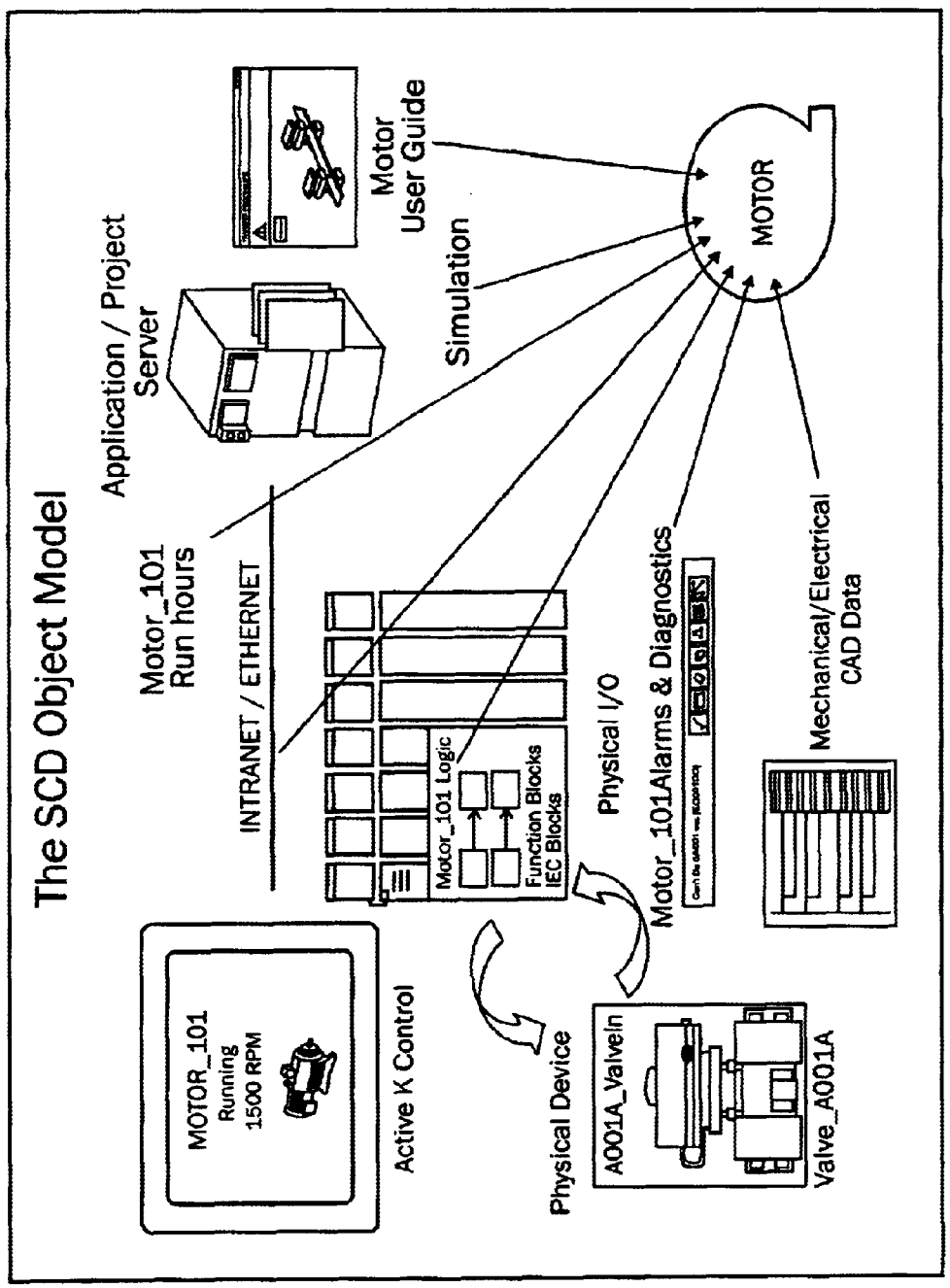
FIG. 13 a graphical diagram of the SCD object module showing all aspects of the technological objects the SCD represents.

A Device Type takes into account all aspects of the technological object it represents, see FIG. 13:

The Supervisory system:

the graphical representation on the operator screen.

the Physical units to be displayed on the operator screen.

the communication with the PLC.

the operator commands to control the device(s) (e.g. a start/stop push button, a prompt to adjust a set point).

the display of alarms.

logging of operator actions.

archival of long-term or short-term historical trends of monitored values of the device(s).

The PLC:

the logic which controls the device(s).

the logic which detects failures and alarms of the PLC logic (with time stamp).

the communication with the Supervisory system.

the attributes and process variables displayed by the Supervisory system.

the I/O connected to the device.

the variables of the device logic.

the communication with the other PLCs or network partners.

the commands to control the device by the PLC logic (e.g., reset, start, stop).

the link with the other devices (e.g. 'forcing').

the resources needed to be able to run (power source, e.g. of a motor)

the prompts for operator action requests.

The Technical drawings and documentation:

reference to electrical drawings.

reference to mechanical drawings.

reference to application software and documentation.

reference to maintenance documents in case of failure.

part number for inventory and replacement of devices.

SCD types are organized in libraries. Different industry segments can create their own libraries of industry specific SCD types. Thus, the definition of SCD types must be flexible in order to cover the different industry needs. Each type contains the definition of the actual control processes, including sequential and continuous procedures specific to the type. It can also include all special procedures, which handle failure conditions, recovery procedures, simulation, diagnostic and other procedures required by the device (process object).

Typically, the SCD types are developed by the system administrator and saved in the generator's library will be the proprietary knowledge of each. Consequently, when a user utilizes the generator 20 for the first time, the first task will be to build a specific SCD Type library. While a supplier can provide a library of generic SCD Types in order for the user to get started, a user library will remain the property of the user that developed it.

The following table shows examples of common SCD Types:

VASD01 (Valve)

PSS01 (Pump)

ATV58MB01 (Speed Drive)

AIA01T (Analog input)

AO01 (Analog output)

DIO01T (Digital I/O)

MOS01 (Motor)

PID01 (PID loop)

The following example is outlined and discussed below as an exemplification of the present invention in order to assist one of ordinary skill in the art with the understanding of the present invention and is not intended to limit the claims or scope of the present invention as set forth herein.

Figure 14:
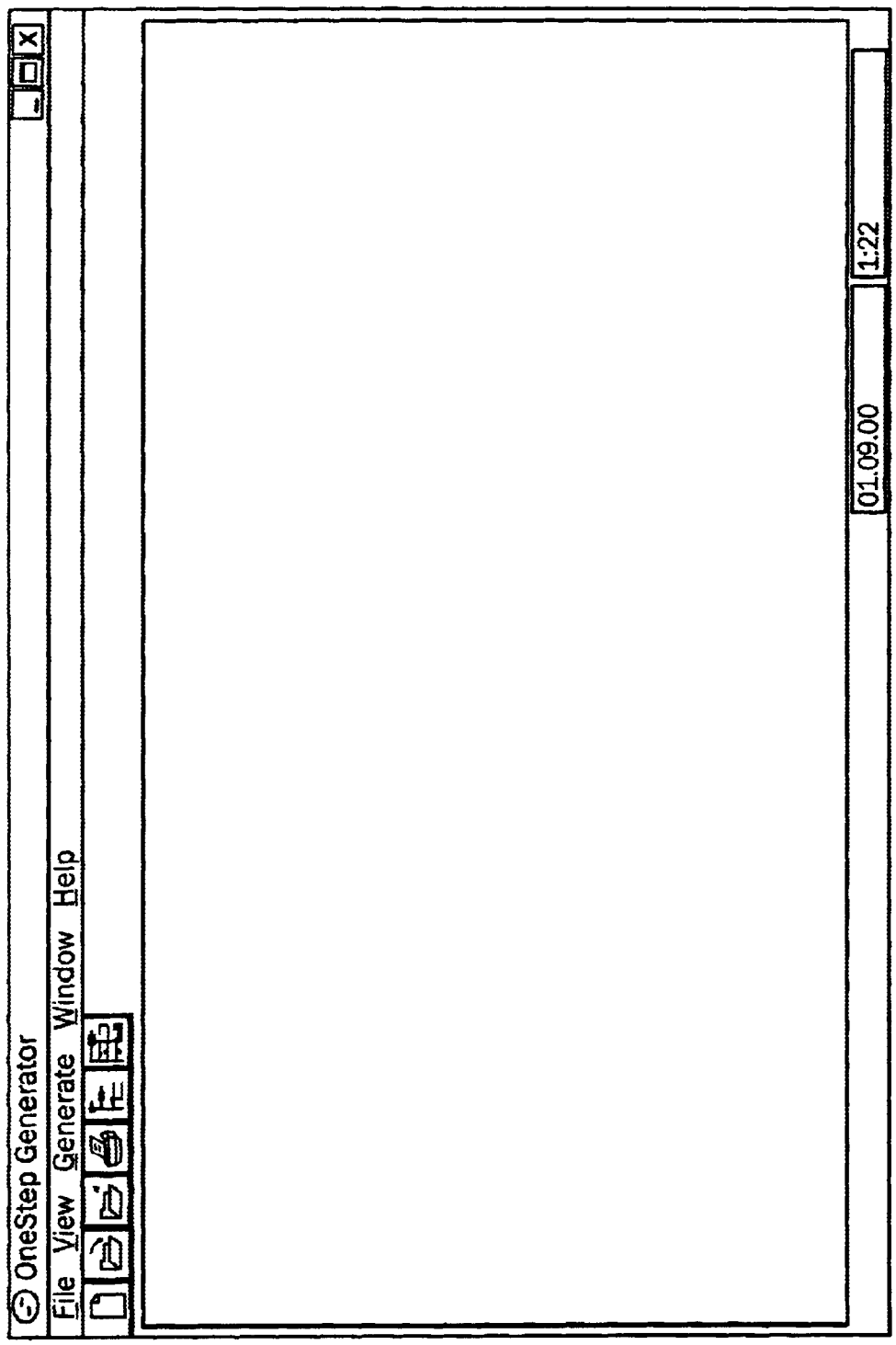
FIG. 14 is a graphical diagram of the program window displayed to the user at the start of using the generator.
Figure 15:
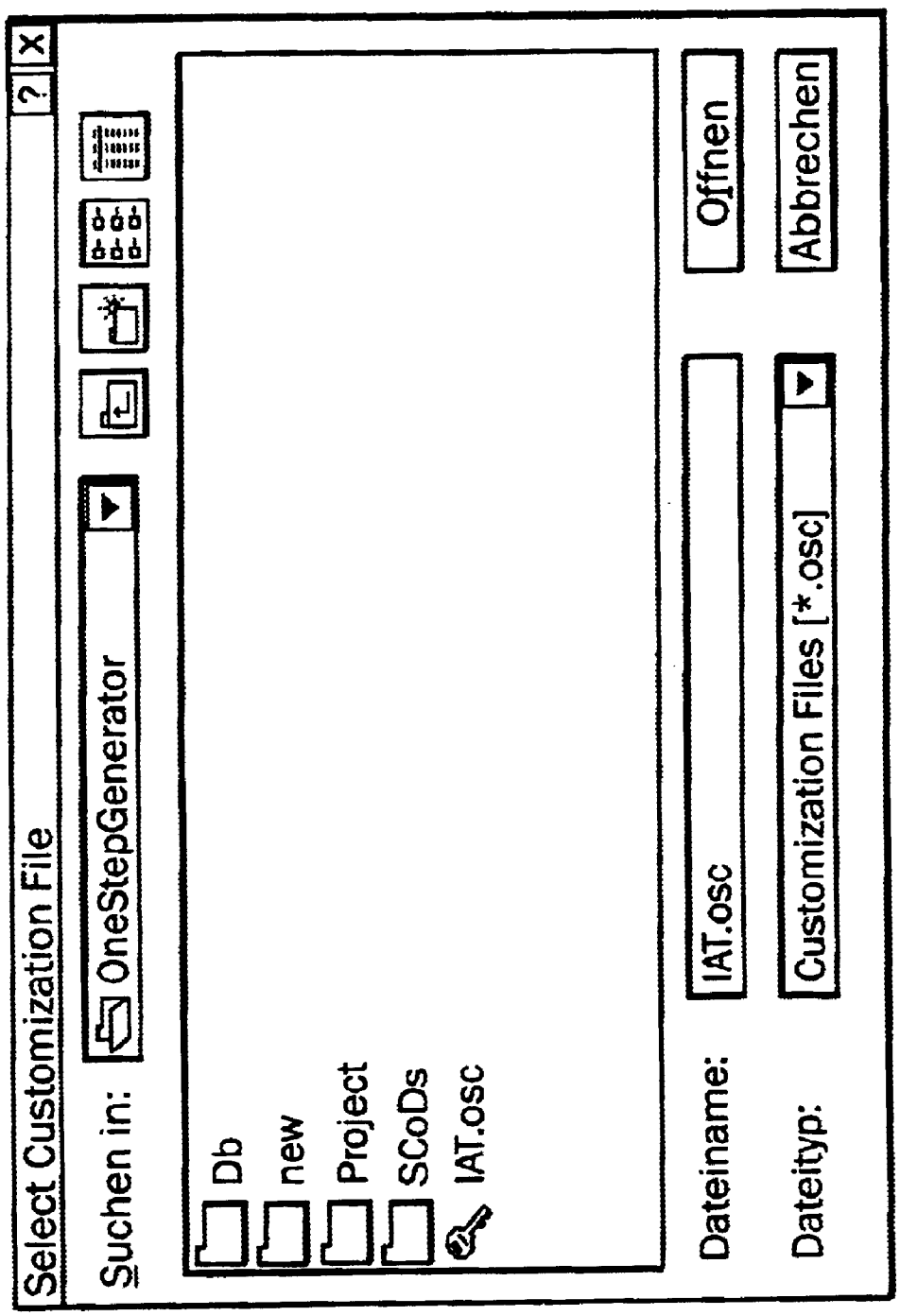
FIG. 15 is a graphical diagram of the program window displayed to the user for selecting a customization file.
Figure 16:
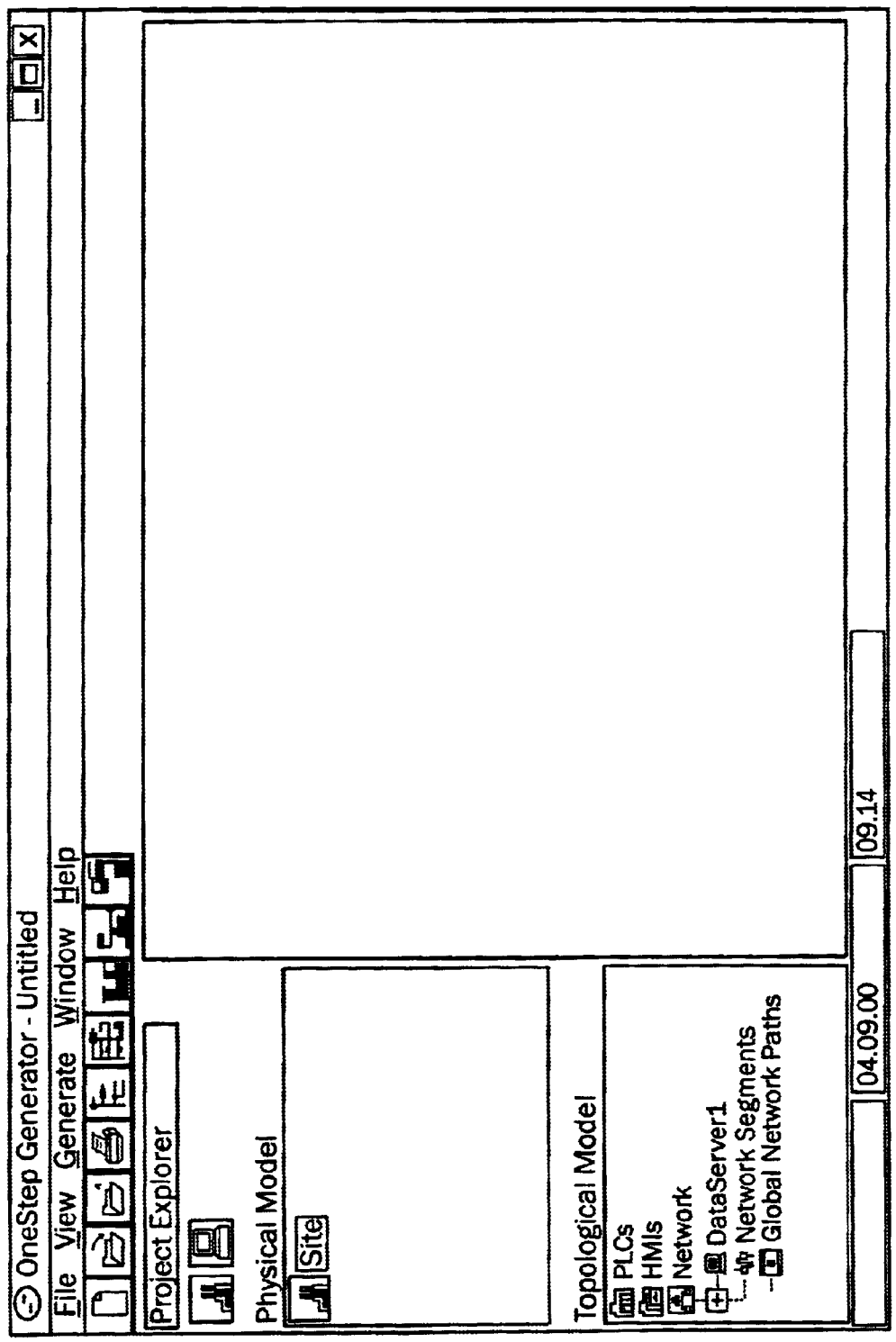
FIG. 16 is a graphical diagram of the program window showing a new untitled project and the trees of the physical and topological models on the left side of the workspace.

A user starts the generation of an application for a control system 24 by selecting the appropriate menu item in the Windows Start menu under Programs/OneStep Generator. FIG. 14 depicts the program window displayed to the user. To start a new project, the user selects either File/New of the menu or clicks the according button of the toolbar. A dialog box will appear for selecting a customization file. FIG. 15. The customization file sets up the generating process according to the user's needs and/or rules. The customization file contains information about naming conventions, used HW; used measurement units and more. A customization file is selected from the dialog box. A new Untitled project is initialized and the trees of the physical and topological models on the left side of the workspace can be seen. FIG. 16.

Figure 17:
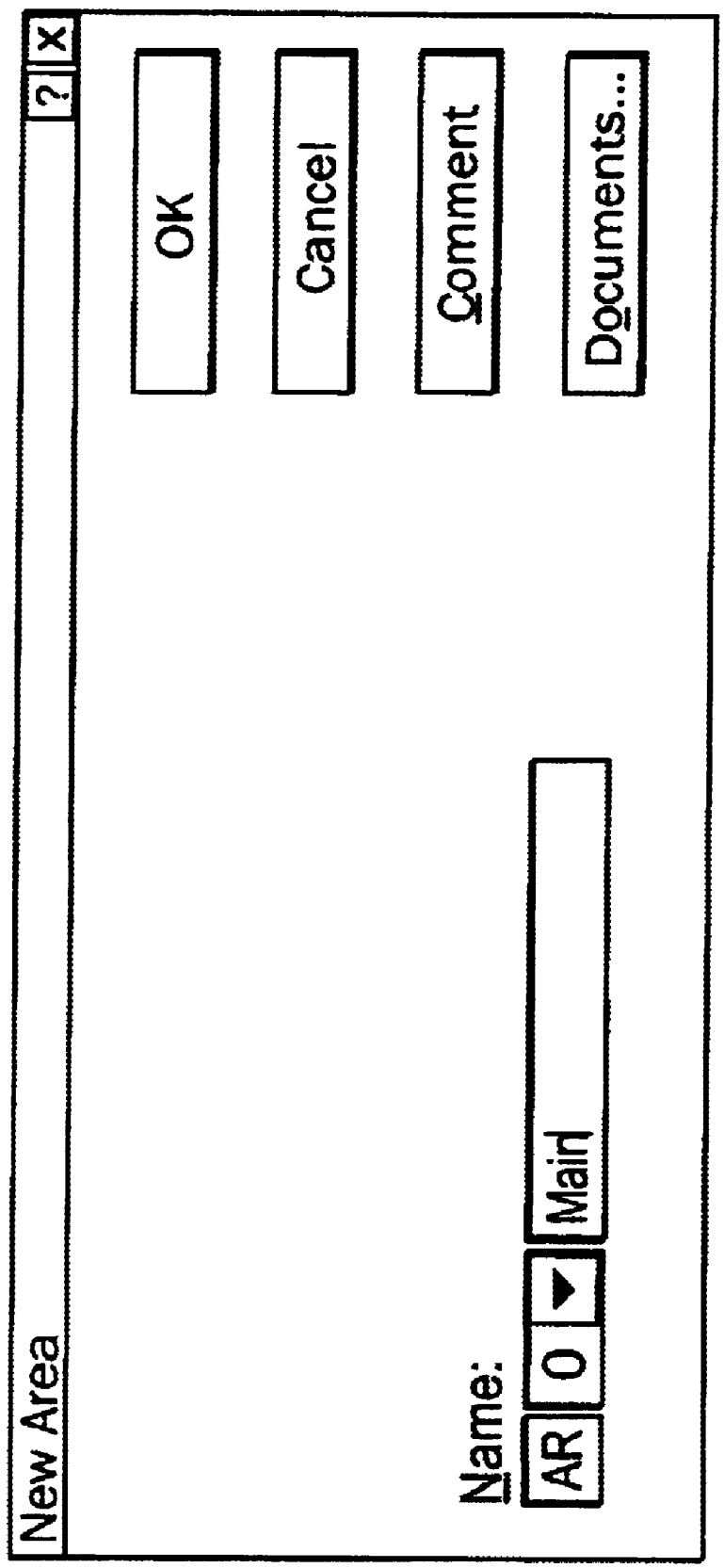
FIG. 17 is a graphical diagram showing the dialog box wherein a user selects a new area and enters a custom name for the new area.
Figure 18:
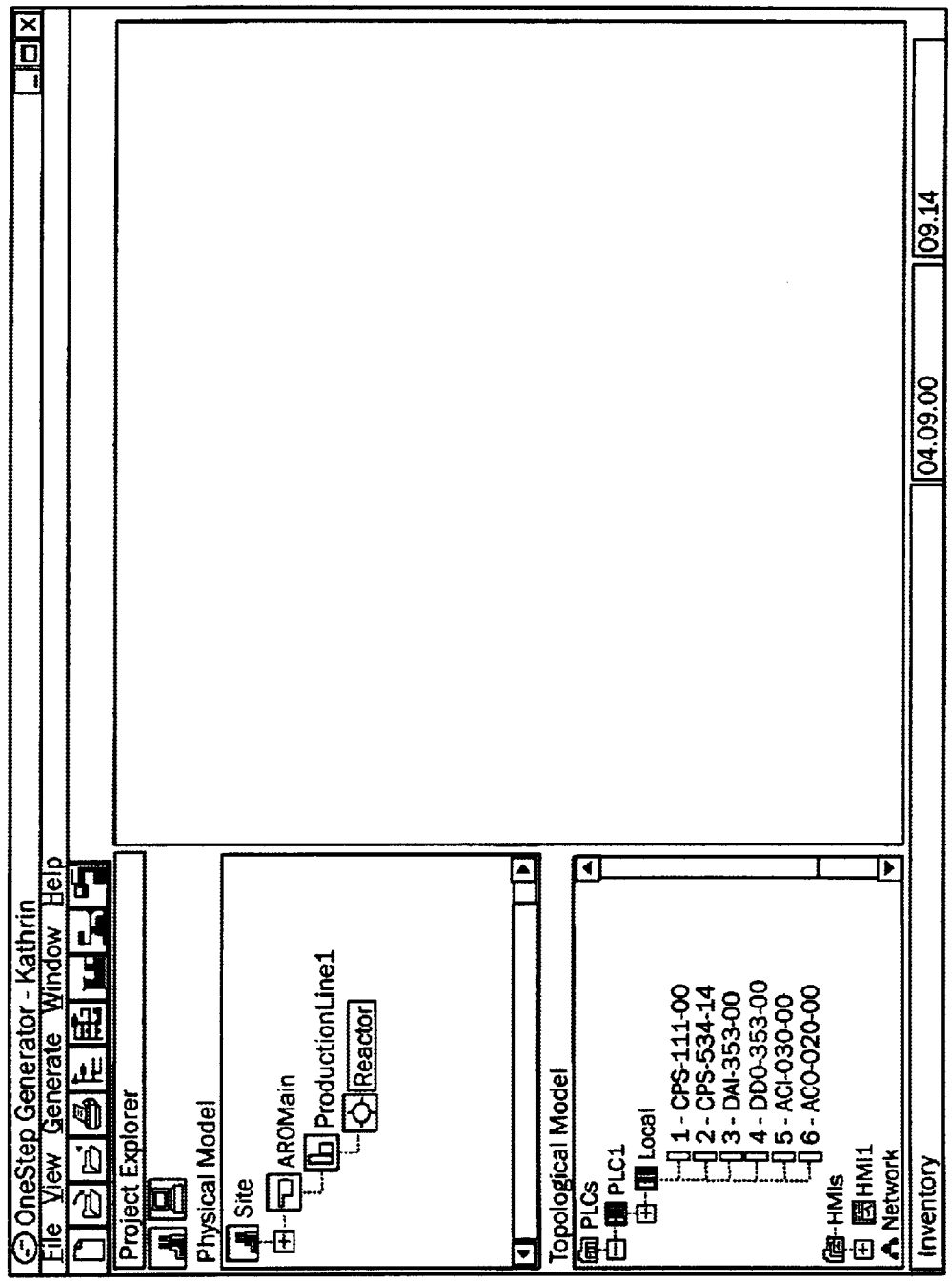
FIG. 18 is a graphical diagram showing the area node, AR0Main.

The user can now describe the physical model 28 of the process. The node Site is selected in the physical model 28 and the menu. Generally, it is a good idea to click with the right mouse button on the object nodes in the tree. Every node has a popup menu where one can create new objects, change properties, delete objects or call other functionality that is useful or necessary for this object. After selecting the Site, the user selects a New Area, FIG. 17, and enters a custom name for the new area. Generally, the format of the name will depend upon the customization file that was chosen. In this example, a naming convention that all Areas start with AR followed by a number was chosen. The last part for the full Area is a field with free text. The name "Main" is entered, or any other name may be used. The new node in the tree, an Area called AR0Main is shown in FIG. 18.

Figure 19:
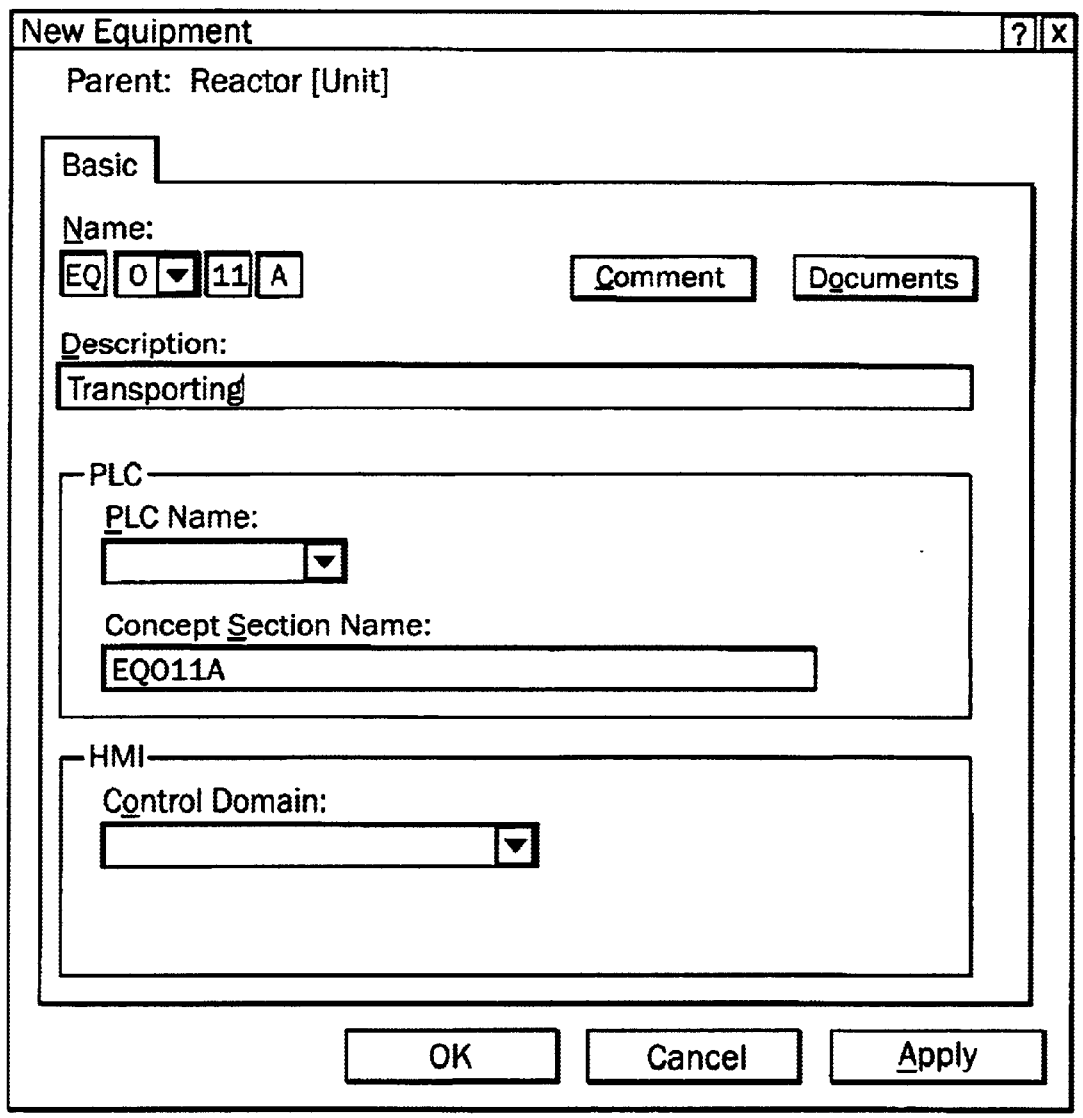
FIG. 19 is a graphical diagram showing the that an equipment will be created after the new area and process cell are defined.
Figure 20:
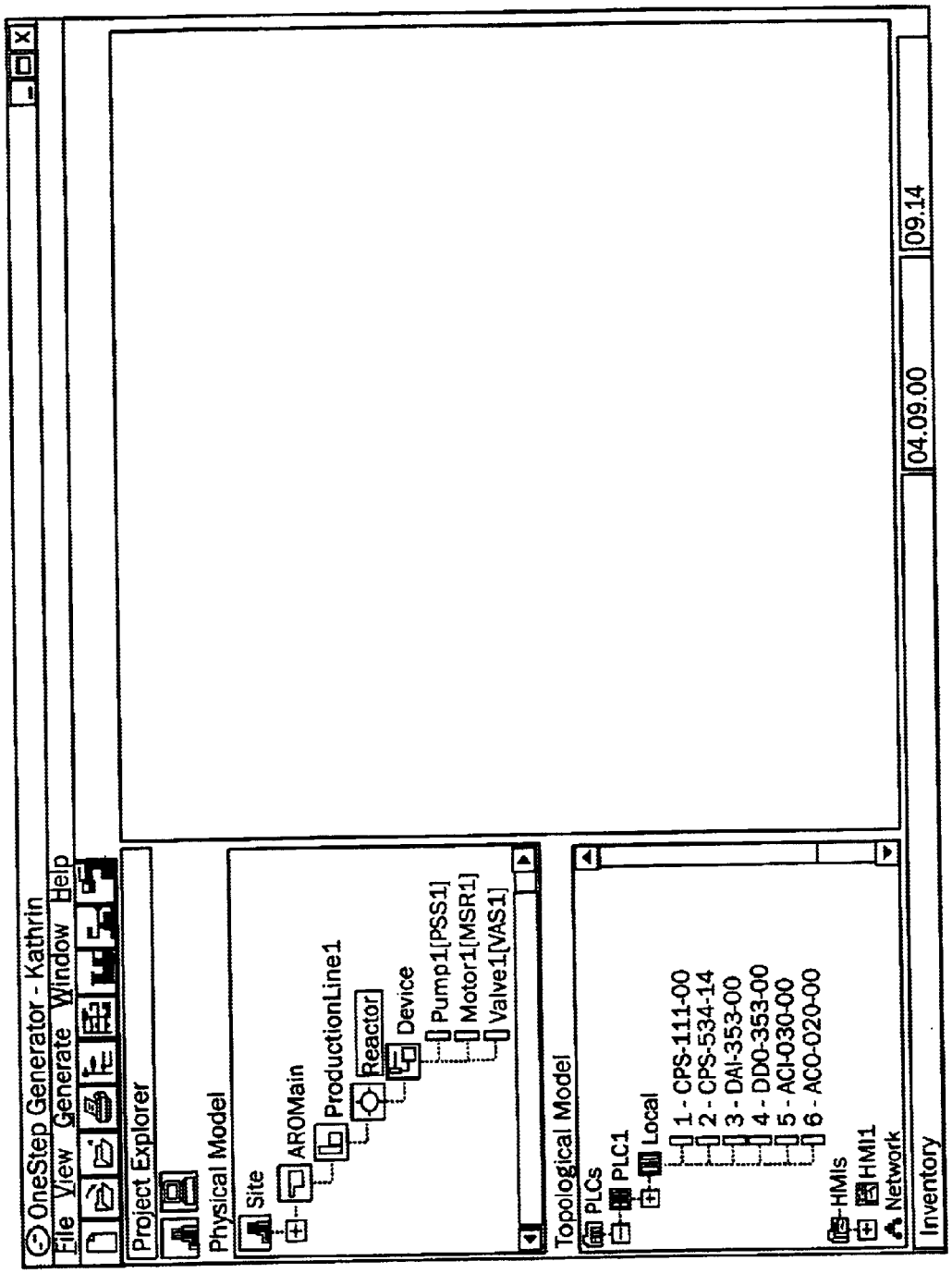
FIG. 20 is a graphical diagram showing the tree of the physical.

After the New Area is defined, a Process Cell is defined. Now an equipment will be created, i.e., UNAReactor. FIG. 19. Typically, the physical model 28 is specified by a process engineer who will not define the topological model 30 with PLCs, HMIs and networks. Once the new equipment 38 is created and the node EQ011A is added to the physical model tree 28, a New Device is defined. The properties for the New Device appear in the properties dialog for devices 36. A name, description and device type of the equipment 38 is entered. In this example, a pump, PSS, was chosen. Other types of devices 36 can also be chosen, i.e., a VSD (Variable Speed Drive). In the same way, two more devices 36 are entered, a Motor1 of type MSR and a Valve 1 of type VAS. Now the tree of the physical model 28 will appear as shown in FIG. 20. With this input, a simple process has been defined.

Figure 21:
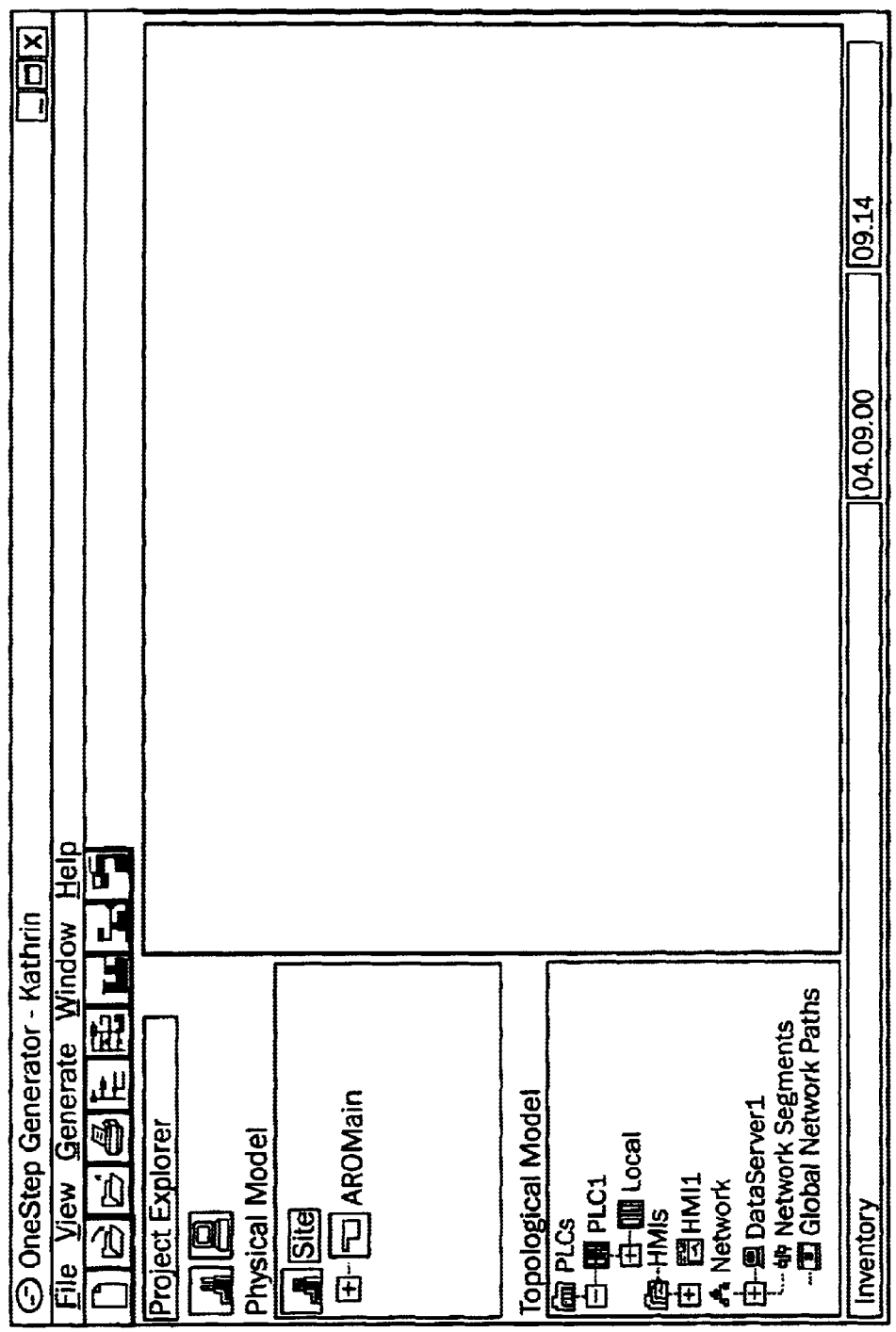
FIG. 21 is a graphical diagram showing the entry of data to configure a rack module.

Now the topological model 30 must be defined in a similar fashion. The topological model 30 describes the PLCs and supervisory stations needed to control the process. The user begins by clicking the right mouse button on the object 'PLC' in the topological model 30. A popup menu will appear and the item New PLC is selected. The appropriate data is entered as shown in FIG. 21. Various industry products are available for the user to choose from.

For the PLCs, it is necessary to specify the used hardware resources. The control hardware setup consists of the PLC CPUs, the racks and I/O modules and the network configuration and communication. In the tree, a new object PLC1 is created. The racks of the PLC are defined by selecting New Rack for PLC1. In this example, a rack with 16 slots is selected. The supervisory system is based on client/server architecture with data servers and operator stations. The complete HMI application is sliced into different control domains to take into account that different operators can control the different parts of the process.

Figure 22:
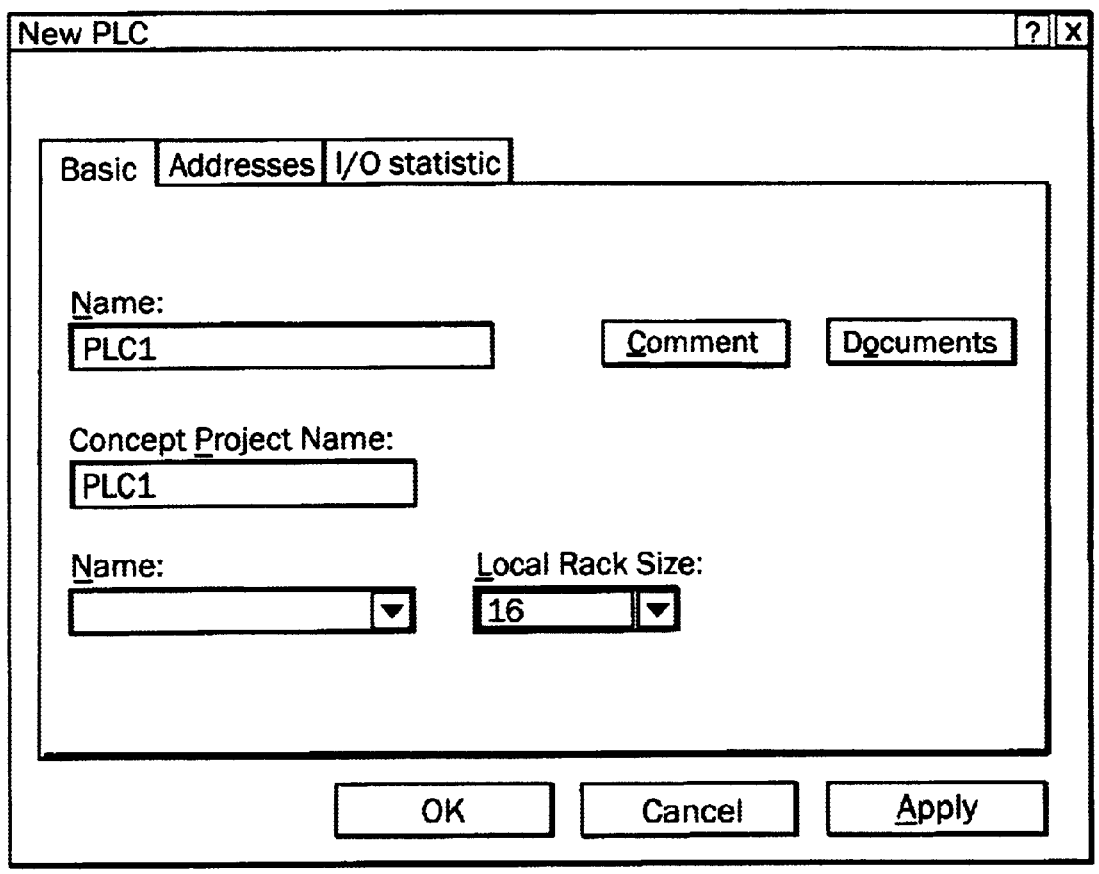
FIG. 22 is a graphical diagram of the dialog box for entry of PLC information.

The hardware modules must now be defined for PLC1. The user brings up the object node local and selects Open Rack. A window opens in the workspace with a grid where the user can enter the hardware configuration of this rack. FIG. 22. All PLC memory assignments are accomplished by the generator 20. The user does not have to be concerned with the address configuration.

Figure 23:
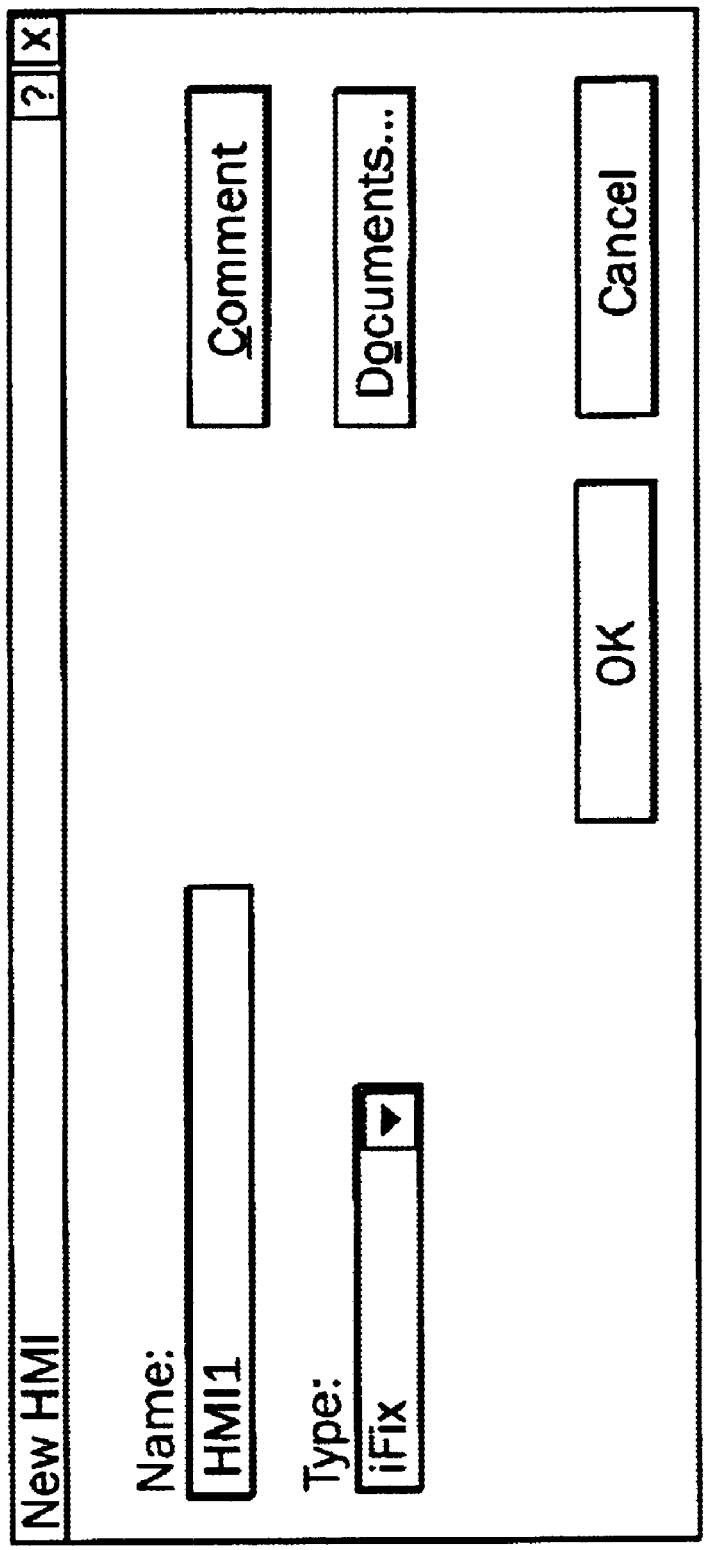
FIG. 23 is a graphical diagram of the dialog box for entry of HMI information.
Figure 24:
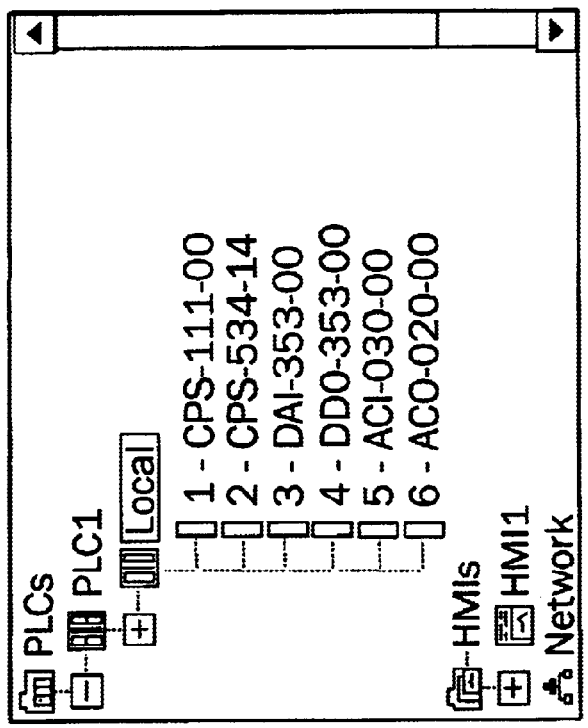
FIG. 24 is a graphical diagram displaying the topological tree model.

After the control process has been defined, the user must define the configuration for the human-machine interface, HMI 34. The user begins by selecting the HMI node in the topological model tree 30 and opening the menu item New HMI. The HMI dialog box appears and the user enters the data as shown in FIG. 23. The next step is to create a Control Domain. A Control Domain is a combination of alarm areas and access rights for the operators of the control system. The control system is segmented into several Control Domains, that are controlled by different operators. The user selects the new Control Domain from the HMI1 of the topological model tree. The Control Domains are displayed in the topological model tree 30. FIG. 24.

Figure 25:
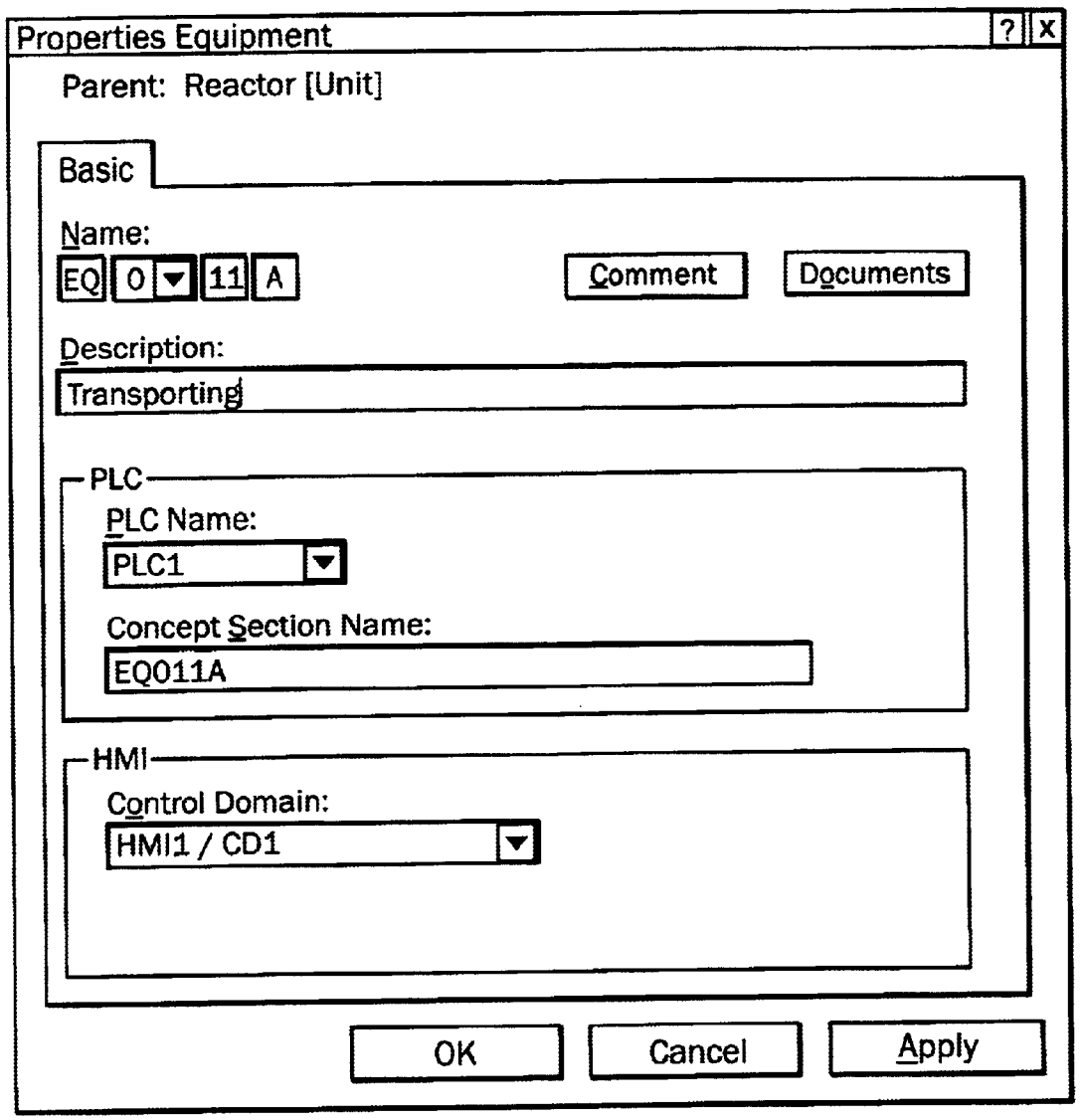
FIG. 25 is a graphical diagram of the data entered for the PLC and HMI.

The equipment 38 and process objects 22 are assigned to the controllers 32. The user selects the popup menu Properties in the physical model tree 28 of the EQ011A equipment. A change to the PLC 32 in the equipment 38 will change all child process objects to the same PLC (however, the process objects may be assigned individually to separate PLCs). The data for the PLC 32 and HMI 34 is entered and shown in FIG. 25.

Figure 26:
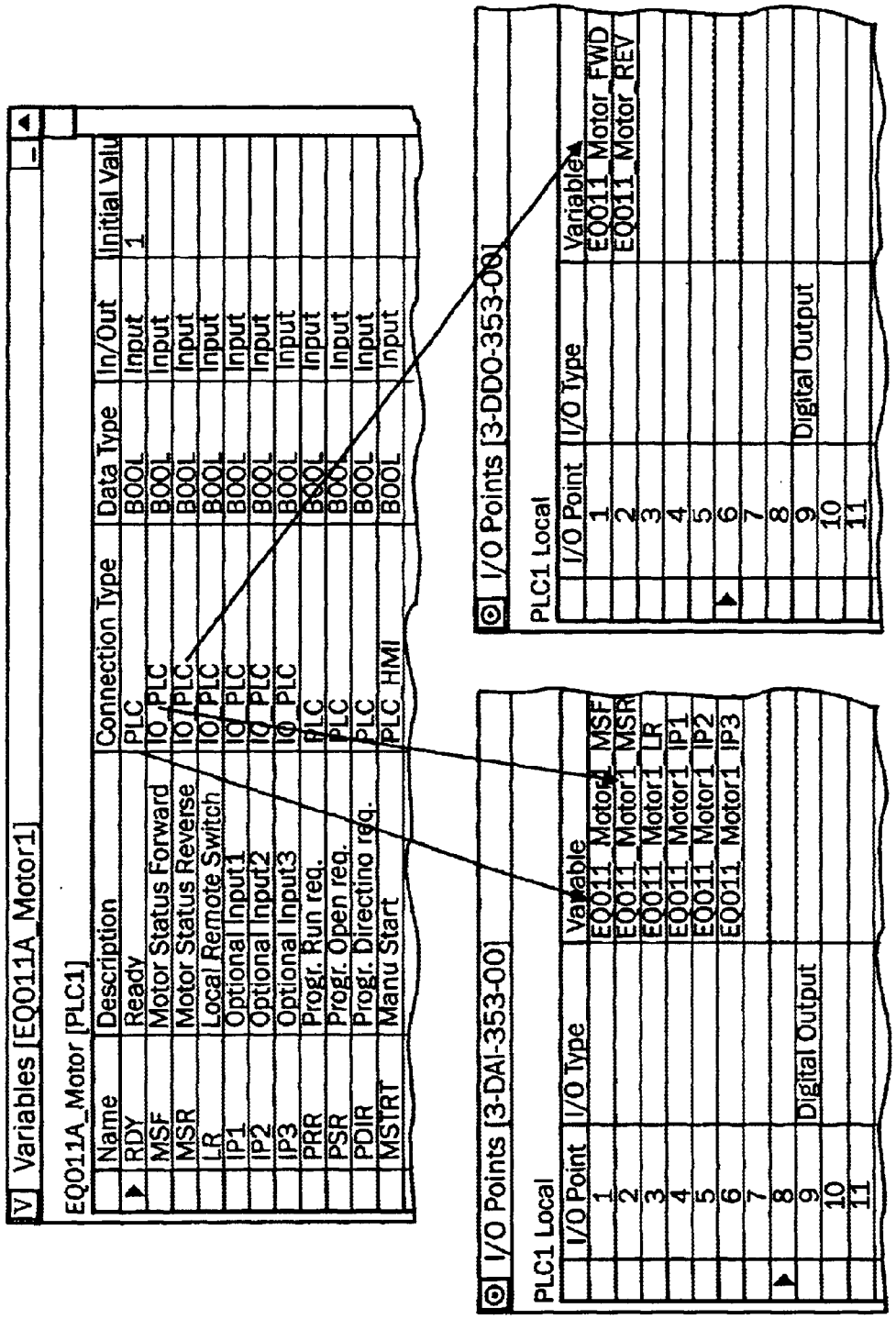
FIG. 26 is a graphical diagram showing the mapped I/O points of the other devices.

After the user has mapped the IO Points of the other devices, FIG. 26, the user identifies where the generated applications will be stored. For every PLC 34 defined, the generator 20 will create a sub-directory with the name of the PLC and will generate the control applications into these directories.

Figure 27:
FIG. 27 is a graphical diagram of the status page showing the results of the generation process.

The generator 20 is started by selecting the appropriate menu item in the menu Generate. When a generator 20 is running, it will provide information about the actual status of its work. The information is categorized as X=information, E=error and W=warning. Next, the Memory Mapper is run. The user can see the address ranges mapped to the different modules by looking at the hardware modules, i.e., selecting Rack1 of PLC1 and selecting Open Rack. After mapping, the topological 30 and physical 28 modules can be analyzed. Although there are errors and some warnings, they are not critical for the generation of application for the programming language and the HMI. FIG. 27. The programming language, preferably Concept, is selected in the Generate menu. When the generation has finished, Done will be displayed.

After the user has successfully generated code for the control language, preferably Concept, the control language can be started and the project file opened. The user can find the project file in the directory specified in the options dialog and in the sub-directory with the name of the PLC. The generator 20 has created all variables necessary for the process objects 22 with the correct data type, initial value and more. The generator 20 has also created segmented action groups according to the process design with the Areas, Process Cells and Units Equipments and Devices. Equipment 38 will be a segment programmed in Function Block Diagram language. There are additional segments for initialization in the group with the same name.

Figure 28:
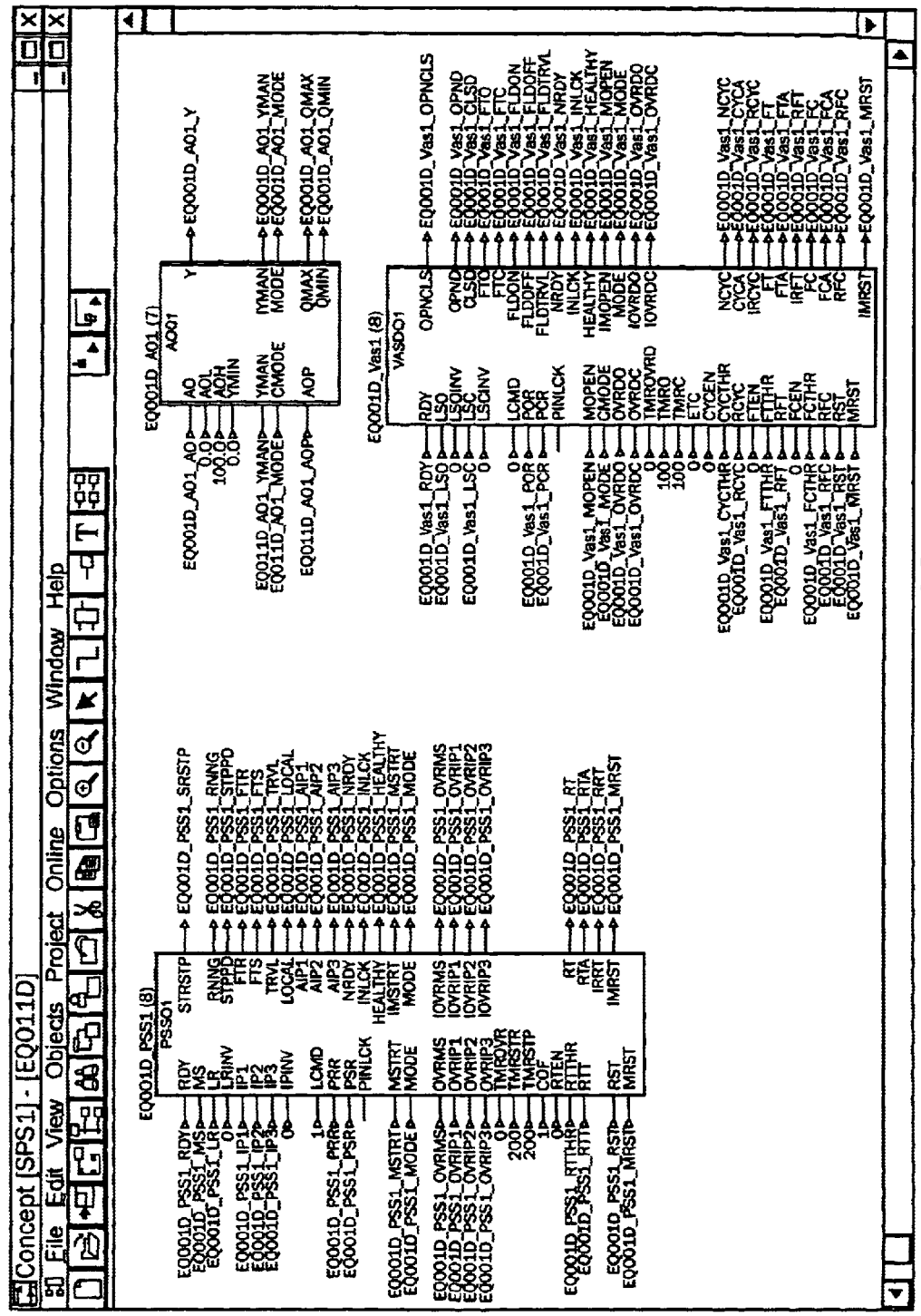
FIG. 28 is a graphical diagram of the generated equipment segment for the programming language Concept; and, FIG. 29 is a graphical diagram of the opened OPC Power Tool.

The segment for the equipment contains all process objects 22 represented by Function Blocks. The inputs and outputs of the Function Blocks are connected with the appropriate variables or literal values or are kept unconnected for additional logic to be entered by the control engineer. The generated equipment segment for Concept is shown in FIG. 28.

The user can now connect to a program language simulator and run the application. The window of the equipment segment should be positioned in such a way so that the TSD Function Block can be viewed and the actual values in the 'PLC' can be seen.

The configuration of the OPC Factory server is also automatically accomplished by the generator. Preferably, iFIX and the OPC IO driver of Intellution should be running before the user can generate the HMI application.

Figure 29:
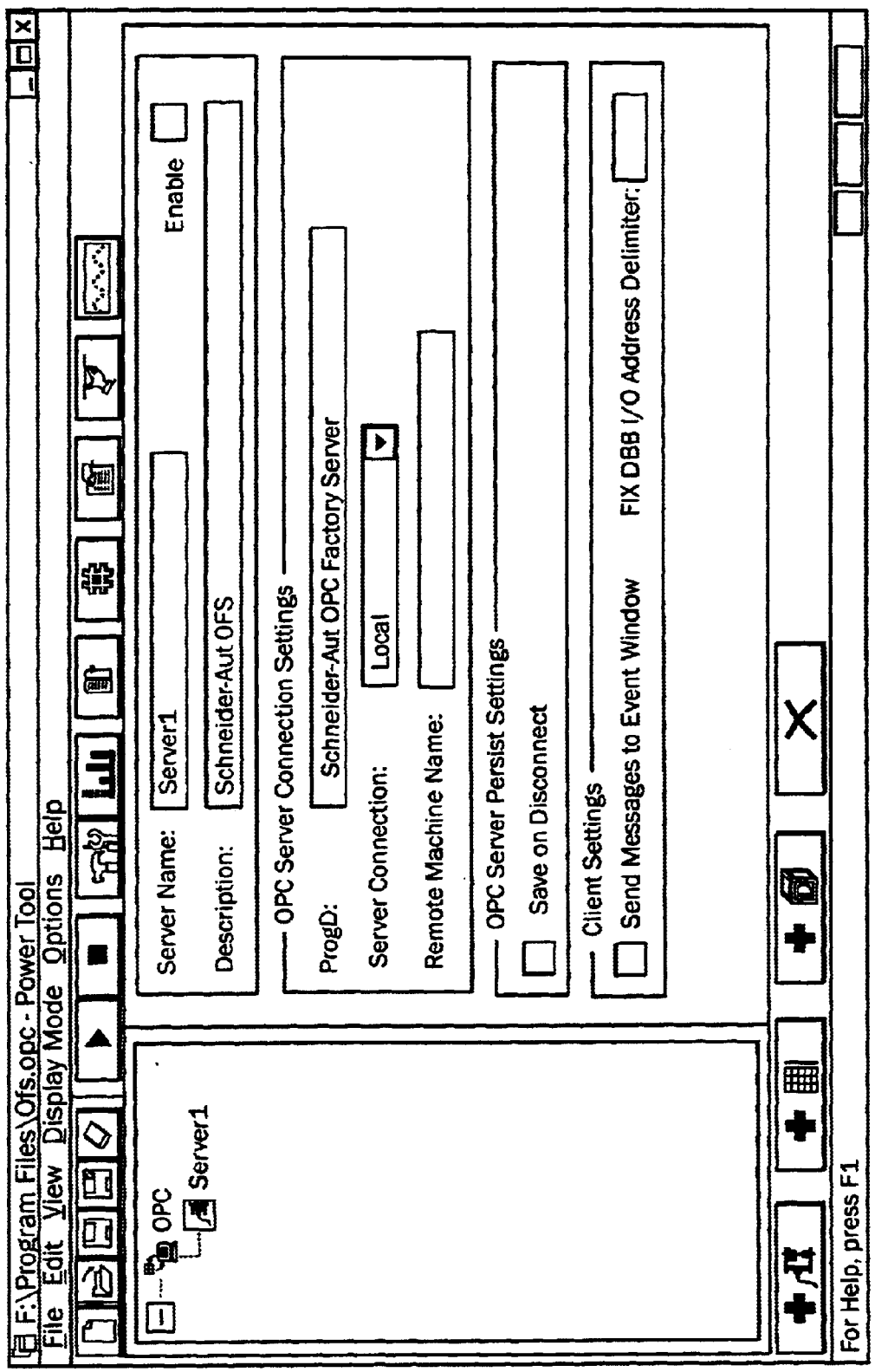

The following example outlines the method of generating an HMI using the preferred embodiment of the present invention. The example is provided to assist one of ordinary skill in the art to better understand the present invention and is not intended to be used to limit the scope of the present invention as claimed. The user selects Programs/iFIX/Startup from the Windows Start menu and waits until the Intellution Dynamics Workspace is running. After ensuring that no Tags are declared on the local FIX node, the user selects IO Drivers and OPC in the model tree. A new dialog box, I/O Driver Server Connection, opens. The user establishes a connection by pressing the Connect button. After the connection is established, the OPC PowerTool opens. FIG. 29.

The generation of the HMI continues by selecting Edit/Add Server from the OPC PowerTool menu bar. Schneider-Aut. OFS is selected from the list. Server1 is entered in the field Server Name and enabled by checking Enable to the right of the server name, then selecting the menu item Display Mode/Start. The configuration is saved as OFS.OPC by using File/Save As.

The application is now prepared for the HMI system. The user can now generate the HMI by selecting Generator/HMI. If more HMIs and Data Servers are created using the generator, all variables and pictures are created on LOCAL NODE in iFIX.

Switching to Run mode, ensure that no picture is open in Configure mode. By using the menu item WorkSpace/Switch to Run, open the Equipment picture by selecting File/EQ011A.grf The debug window of the OFS and the graphical display of the SCD created by the generator 20 will appear.

It is a preferable to arrange the windows of Concept, iFIX and the simulator on the desktop so that one can view them concurrently on a screen. The graphical symbols display the current state of the process objects by reading the real time values in the PLC.

The user can operate the SCD 22 by clicking on the symbol just below the name. A dialog box will open where one can switch to manual mode by clicking on the switch and the Apply button. All this functionality has been made available to the user without having to program in the PLC and HMI. A tag database has been automatically generated in iFIX which maps exactly to the process objects configured. The user can use them to create and animate additional graphics in iFIX used for alarming, historical data and much more.

Preferably, the following software is required to be installed for use with the preferred embodiment of the present invention:
  Intellution Dynamics iFIXV2.21
  Intellution OPC OLE for Process Control V7x driver from
    Intellution iFIX I/O & OPC Servers CD and select
    Server
  Schneider Automation Concept V2.2 Service release
  Schneider Automation OPC Factory Sever V2.0 B831 or
    higher
Note: If you want to generate documentation from your Process design you have to have MS-Word installed on your PC.

While the specific embodiments have been illustrated and described, numerous modifications are possible without departing from the scope or spirit of the invention.

We claim:

1. A method of generating an application for a control process, the method comprising the steps of:
   providing a single entity device representing at least one process object, the device comprises a supervisory aspect and a control aspect of the device;
   defining a physical model of the control process, the physical model having a structure, the structure having a hierarchy of levels comprising at least one device;
   defining a topological model of the control process, the topological model having an architecture comprising a controller and a human-machine interface;
   inputting the physical and topological models into a generator;
   analyzing the physical model and the topological model; and,
   generating an application for the controller, the application comprising a control aspect and a human-interface aspect.

2. The method of generating an application of claim 1 further comprising customizing the generator.

3. The method of generating an application of claim 2 wherein the hierarchy of levels of the physical model of the control process further comprise a site, an area, a process cell, a unit and an equipment, the equipment comprising at least one device, the unit comprising at least one equipment, the process cell comprising at least one unit, the area comprising at least one process cell and the site comprising at least one area.

4. The method of generating an application of claim 3 further comprising assigning the at least one device to a controller.

5. The method of generating an application of claim 4 further comprising mapping an address to a hardware module.

6. The method of generating an application of claim 5 further comprising:
   complementing the physical model with control information; and,
   completing the application for the controller with a programming tool.

7. The method of generating an application of claim 6 wherein the control aspect and the human-machine interface aspect of the application is generated simultaneously.

8. The method of claim 3 wherein the step of defining the physical model comprises the steps of:
   defining the area;
   defining the process cell;
   defining the unit;
   defining the equipment; and,
   defining the device for the equipment.

9. The method of claim 1 wherein the step of defining the topological model comprises:
   defining the network comprising the steps of:
      defining a network segment;
      defining a global network path; and,
      defining a network partner.

10. The method of claim 1 wherein the step of defining the topological model comprises:
    defining the controller comprising the steps of:
       defining a programmable logic controller;
       defining a rack for the programmable logic controller;
       defining a module within each rack; and,
       defining a connection to a network segment.

11. The method of claim 1 wherein the step of defining the topological model comprises:
    defining the human-machine interface comprising the steps of:
       defining a human-machine interface application;
       defining a path for the human-machine interface application;
       defining an alarm overview for the human-machine interface;
       defining the control domain of the human-machine interface, and,
       assigning an alarm overview to the control domain.

12. The method of claim 1 wherein the step of defining the topological model comprises:
    defining a data server comprising the steps of:
       defining the data server;
       defining a time out for the data server; and,
       defining a connection to the network.

13. The method of claim 1 wherein the step of complementing the physical model with control information comprises:
    assigning a PLC to the equipment;
    defining a section name for a code generated for the equipment;
    assigning an HMI/control domain to the equipment;
    defining an alarm view different from the alarm view of the control domain for the equipment;
    defining a free variable for the equipment;
    defining a free variable for the device; and,
    assigning a variable of type IO-PLC to the IO module.

14. The method of claim 1 wherein analyzing the physical model and the topological model comprises:
    analyzing the physical model and the topological model;
    displaying the results of the analysis;
    examining the results of the analysis; and,
    repeating the analyzing, the displaying and the examining until the physical model and the topological model are ready to be input into a application generator.

15. The method of claim 1 wherein generating the human-machine interface application comprises:
    generating the human-machine interface application with the application generator; and,
    completing the human-machine application with the appropriate tools.

16. The method of claim 1 comprising the step of customizing the application generator.

17. The method of claim 16 wherein the customizing the application generator comprises:
    defining a library to be used in the project;
    defining a tool to document the process;
    defining a length of a comment field;
    defining a naming convention for the elements of the application generator;
    defining a user access level;
    defining an alarm priority;
    defining a display format for numerals;
    defining a measurement group;

defining a measurement unit;

defining a controller allowed in the project;

defining a controller backplane allowed in the project; and, defining a module allowed in the project.

18. An apparatus for generating an application for a control system wherein a control process is defined as a physical model and a topological model, the apparatus comprising:

an analyzer for examining the physical model and the topological model to ensure operable cooperation between the physical and topological models; and, a generator for receiving the physical model and the topological model, the generator generates the application to be executed on the control system.

19. The apparatus of claim 18 further comprising:

a customization file for establishing a naming convention, a measurement convention and a list of accessible hardware as designated by a user project having a control system, the application is generated from an application generator having an input of a physical model of the control system and an input of a topological model of the control system, the application comprising:

an application for a controller; and, an application for a human-machine interface.

20. The application of claim 19 wherein the application for the controller generated by the application generator comprises:

a controller configuration;

a code for a device operably connected to the controller;

a code for displaying the status of the controller in the human-machine interface;

a code for initializing the controller;

a code for communication channels; and, a variable.

21. A single entity device for representing a control object in a process control system, the single entity device comprising:

a control facet representing a controlling aspect of the control object, the control facet being operably connected to a control system; and, a human-machine interface facet representing a supervisory aspect of the control object, the human-machine interface facet being operably connected to a supervisory system.

22. The single entity device of claim 21 wherein the control object is a software object for virtual representation of a control regulation.

23. The single entity device of claim 21 further comprising:

a network facet representing a network communication aspect of the control object, the network facet being operably connected to a network communication system.

24. The single entity device of claim 21 further comprising:

a documentation facet representing a drawing aspect of the control object, the documentation facet being operably connected to the control system.

25. The documentation facet of claim 24 comprises at least one drawing associated with the single entity device, the drawing comprising at least one of the following: an electrical aspect, a mechanical aspect, a software aspect, a maintenance aspect, a computer aided design aspect and an identification aspect.

* * * * *